United States Patent
Bala et al.

(10) Patent No.: US 11,621,817 B2
(45) Date of Patent: Apr. 4, 2023

(54) METHODS, APPARATUS, SYSTEMS, ARCHITECTURES AND INTERFACES FOR UPLINK CONTROL INFORMATION (UCI) TRANSMISSION VIA UPLINK SHARED DATA CHANNEL

(71) Applicant: IDAC Holdings, Inc., Wilmington, DE (US)

(72) Inventors: Erdem Bala, Melville, NY (US); Moon-Il Lee, Melville, NY (US); Shahrokh Nayeb Nazar, San Diego, CA (US)

(73) Assignee: InterDigital Patent Holdings, Inc., Wilmington, DE (US)

(*) Notice: Subject to any disclaimer, the term of this patent is extended or adjusted under 35 U.S.C. 154(b) by 0 days.

(21) Appl. No.: 16/621,940

(22) PCT Filed: Jun. 7, 2018

(86) PCT No.: PCT/US2018/036442
§ 371 (c)(1),
(2) Date: Dec. 12, 2019

(87) PCT Pub. No.: WO2018/231626
PCT Pub. Date: Dec. 20, 2018

(65) Prior Publication Data
US 2020/0213057 A1 Jul. 2, 2020

Related U.S. Application Data

(60) Provisional application No. 62/543,198, filed on Aug. 9, 2017, provisional application No. 62/519,505, filed on Jun. 14, 2017.

(51) Int. Cl.
*H04L 5/00* (2006.01)
*H04L 1/00* (2006.01)
(Continued)

(52) U.S. Cl.
CPC .......... *H04L 5/0051* (2013.01); *H04L 1/0026* (2013.01); *H04L 1/0031* (2013.01);
(Continued)

(58) Field of Classification Search
CPC ... H04L 5/0053; H04L 1/0026; H04L 1/0031; H04L 5/0007; H04L 5/0023;
(Continued)

(56) References Cited

U.S. PATENT DOCUMENTS

2007/0223622 A1* 9/2007 Bang ................ H04L 1/0625
375/299
2012/0113831 A1* 5/2012 Pelletier ............ H04L 5/0058
370/252
(Continued)

FOREIGN PATENT DOCUMENTS

CN 102187726 A 9/2011
CN 103563322 A 2/2014
(Continued)

OTHER PUBLICATIONS

Multiplexing scheme with UCI and data on PUSCH, 3GPP Tdoc R1-102387, 3GPP TSG RAN WG1 #60bis, Beijing, China, Apr. 12-16, 200, 3 pages.
(Continued)

*Primary Examiner* — Benjamin H Elliott, IV
(74) *Attorney, Agent, or Firm* — Jamie T. Nguyen

(57) ABSTRACT

A method implemented in a transmitter/transceiver, the method including mapping any number of elements of an uplink control information (UCI) signal sequence (SS) to available subcarriers for transmitting an OFDM symbol for carrying information associated with a Physical Uplink Shared Channel (PUSCH), each of the subcarriers having at least two layers, precoding the mapped elements as a function of the layer of the subcarrier to which the elements are
(Continued)

(a)

(b)

mapped, wherein a first precoding applied to a mapped element of a first layer of a subcarrier is different than a second precoding applied to a mapped element of a second layer of the same subcarrier, feeding the mapped elements of the UCI SS to an IDFT unit and transforming the mapped elements into an IDFT transformed signal that includes the mapped elements of the UCI SS carried by a plurality of resources for transmission.

18 Claims, 26 Drawing Sheets

(51) Int. Cl.
    *H04L 27/26*     (2006.01)
    *H04W 72/04*     (2023.01)

(52) U.S. Cl.
    CPC .......... *H04L 5/0007* (2013.01); *H04L 5/0023* (2013.01); *H04L 5/0053* (2013.01); *H04L 27/2613* (2013.01); *H04L 27/2636* (2013.01); *H04W 72/0413* (2013.01); *H04L 27/26134* (2021.01)

(58) Field of Classification Search
    CPC ............. H04L 27/2613; H04L 27/2636; H04L 5/0051; H04W 72/0413
    See application file for complete search history.

(56) References Cited

U.S. PATENT DOCUMENTS

| | | | | |
|---|---|---|---|---|
| 2013/0016687 A1* | 1/2013 | Yang | ...................... | H04L 1/1614 370/329 |
| 2013/0022009 A1* | 1/2013 | Yang | ...................... | H04L 1/0073 370/329 |
| 2015/0049676 A1* | 2/2015 | Tiirola | .................... | H04L 5/001 370/329 |
| 2015/0117350 A1* | 4/2015 | Seo | ........................ | H04L 5/0048 370/329 |
| 2015/0207609 A1* | 7/2015 | Nam | ..................... | H04L 5/0026 370/329 |
| 2015/0382337 A1* | 12/2015 | Ko | ........................ | H04B 7/0413 370/335 |
| 2017/0054541 A1 | 2/2017 | Fröberg et al. | | |
| 2018/0205525 A1* | 7/2018 | He | ........................ | H04L 5/0055 |
| 2019/0052414 A1* | 2/2019 | Babaei | ................. | H04L 5/0055 |
| 2020/0036470 A1* | 1/2020 | Olesen | ................. | H04L 1/0025 |
| 2020/0067680 A1* | 2/2020 | Nayeb Nazar | .... | H04W 72/0453 |
| 2020/0076670 A1* | 3/2020 | Liu | ........................ | H04L 5/0007 |
| 2020/0213057 A1* | 7/2020 | Bala | ...................... | H04L 1/0031 |

FOREIGN PATENT DOCUMENTS

| | | |
|---|---|---|
| CN | 106559878 A | 4/2017 |
| EP | 1830508 A2 | 9/2007 |
| EP | 2541824 A1 | 1/2013 |
| JP | 2010068223 A | 3/2010 |
| JP | 2010536260 A | 11/2010 |
| JP | 2012044645 A | 3/2012 |
| RU | 2575414 C2 | 2/2016 |
| WO | WO 2011155773 A2 | 12/2011 |
| WO | WO 2015148001 A1 | 10/2015 |

OTHER PUBLICATIONS

International Search Report, International Patent Application No. PCT/US2018/036442, dated Sep. 6, 2018, 15 pages.
UCI Multiplexing on PUSCH in UL-MIMO Transmissions, 3GPP Tdoc R1-104216, 3GPP TSG RAN1#61bis, Dresden, Germany, Jun. 28-Jul. 2, 2010, 13 pages.
Ericsson,Signaling of UCI on PUSCH, 3GPP Tdoc R1-105329, 3GPP TSG-RAN WG1 #62bis, Xia€™an, China, Oct. 11-16, 2010, 6 pages.
English Language Abstract, Japanese Publication No. 2010-068223, Mar. 25, 2010, 1 page.
English Language Abstract, Japanese Publication No. 2012-044645, Mar. 1, 2012, 1 page.
English Language Abstract, Russian Publication No. 2575414, Feb. 20, 2016, 1 page.
"UCI multiplexing in the presence of UL data", 3GPP Tdoc R1-1612239, 3GPP TSG-RAN WG1 #87, Reno, USA, Nov. 14-18, 2016, 3 pages.
"Simultaneous Uplink Transmissions and Uplink Transmission Combinations with Carrier Aggregation", 3GPP Tdoc R1-110791, 3GPP TSG-RAN WG1 #64, Taipei, Feb. 21-25, 2011, 4 pages.
"PDCP Header Compression for QoS flows", 3GPP Tdoc R2-1707399, 3GPP TSG RAN WG2#NR_AdHoc#2, Qingdao, China, Jun. 27-29, 2017, 2 pages.
"On Transmission of Uplink Control Information for Enhanced LAA", 3GPP Tdoc R1-165148, 3GPP TSG RAN WG1 #85, Nanjing, China, May 23-27, 2016, 5 pages.
"UCI multiplexing in the presence of UL data", 3GPP Tdoc R1-1703322, 3GPP TSG RAN WG1#88 Athens, Greece, Feb. 13-17, 2017, 3 pages.
English Language Abstract, Chinese Publication No. 106559878, Feb. 17, 2017.

* cited by examiner

US 11,621,817 B2

METHODS, APPARATUS, SYSTEMS, ARCHITECTURES AND INTERFACES FOR UPLINK CONTROL INFORMATION (UCI) TRANSMISSION VIA UPLINK SHARED DATA CHANNEL

CROSS-REFERENCE TO RELATED APPLICATIONS

This application is the National Stage entry under 35 U.S.C. § 371 of Patent Cooperation Treaty Application PCT/US18/36442, filed 7 Jun. 2018, which claims the benefit of U.S. Provisional Patent Application No. 62/519,505, filed 14 Jun. 2017 and U.S. Provisional Patent Application No. 62/543,198, filed 9 Aug. 2017, the entire contents of which are hereby incorporated by reference as is fully set forth herein, for all purposes.

BACKGROUND

The field of the present invention relates to communications and, more particularly, to methods, apparatus, systems, architectures and interfaces for communications in an advanced or next generation wireless communication system, including communications carried out using a new radio and/or new radio access technology and involve transmission of control information, such as uplink control information, and reference signals.

SUMMARY

A representative device has circuitry, including any of a processor, memory, a receiver, and a transmitter; the processor configured to map, at a subcarrier mapping unit, any number of elements of an uplink control information (UCI) signal sequence to a subset of a set of available subcarriers for transmitting an Orthogonal Frequency Division Multiplexing (OFDM) symbol for carrying information associated with a Physical Uplink Shared Channel (PUSCH), wherein each of the subcarriers has at least two layers; precode the mapped elements as a function of the layer of the subcarrier to which the elements are mapped, wherein a first precoding applied to a mapped element of a first layer of a subcarrier is different than a second precoding applied to a mapped element of a second layer of the same subcarrier; input, to an Inverse Discrete Fourier transform (IDFT) unit, the mapped elements of the UCI signal sequence; and transform, using the IDFT unit, the mapped elements into an IDFT transformed signal such that the IDFT transformed signal includes the mapped elements of the UCI signal sequence carried by a plurality of resources for transmission; and the transmitter is configured to transmit the IDFT transformed signal as an OFDM signal.

Methods, apparatuses, and systems for reference signal configuration, generation, and/or transmission implemented in a transmitter/receiver are provided. A representative method includes mapping, at a subcarrier mapping unit, any number of elements of an uplink control information (UCI) signal sequence to a subset of a set of available subcarriers for transmitting an Orthogonal Frequency Division Multiplexing (OFDM) symbol for carrying information associated with a Physical Uplink Shared Channel (PUSCH), wherein each of the subcarriers has at least two layers; precoding the mapped elements as a function of a layer of the subcarrier to which the elements are mapped, wherein a first precoding applied to a mapped element of a first layer of a subcarrier is different than a second precoding applied to a mapped element of a second layer of the same subcarrier; feeding, to an Inverse Discrete Fourier transform (IDFT) unit, the mapped elements of the UCI signal sequence; and transforming, using the IDFT unit, the mapped elements into an IDFT transformed signal such that the IDFT transformed signal includes the mapped elements of the UCI signal sequence carried by a plurality of resources for transmission.

BRIEF DESCRIPTION OF THE DRAWINGS

A more detailed understanding may be had from the Detailed Description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals in the Figures indicate like elements, and wherein.

DETAILED DESCRIPTION

A detailed description of illustrative embodiments may now be described with reference to the figures. However, while the present invention may be described in connection with representative embodiments, it is not limited thereto and it is to be understood that other embodiments may be used or modifications and additions may be made to the described embodiments for performing the same function of the present invention without deviating therefrom.

Although the representative embodiments are generally shown hereafter using wireless network architectures, any number of different network architectures may be used including networks with wired components and/or wireless components, for example.

Example Networks for Implementation of the Invention

Figure 1A:
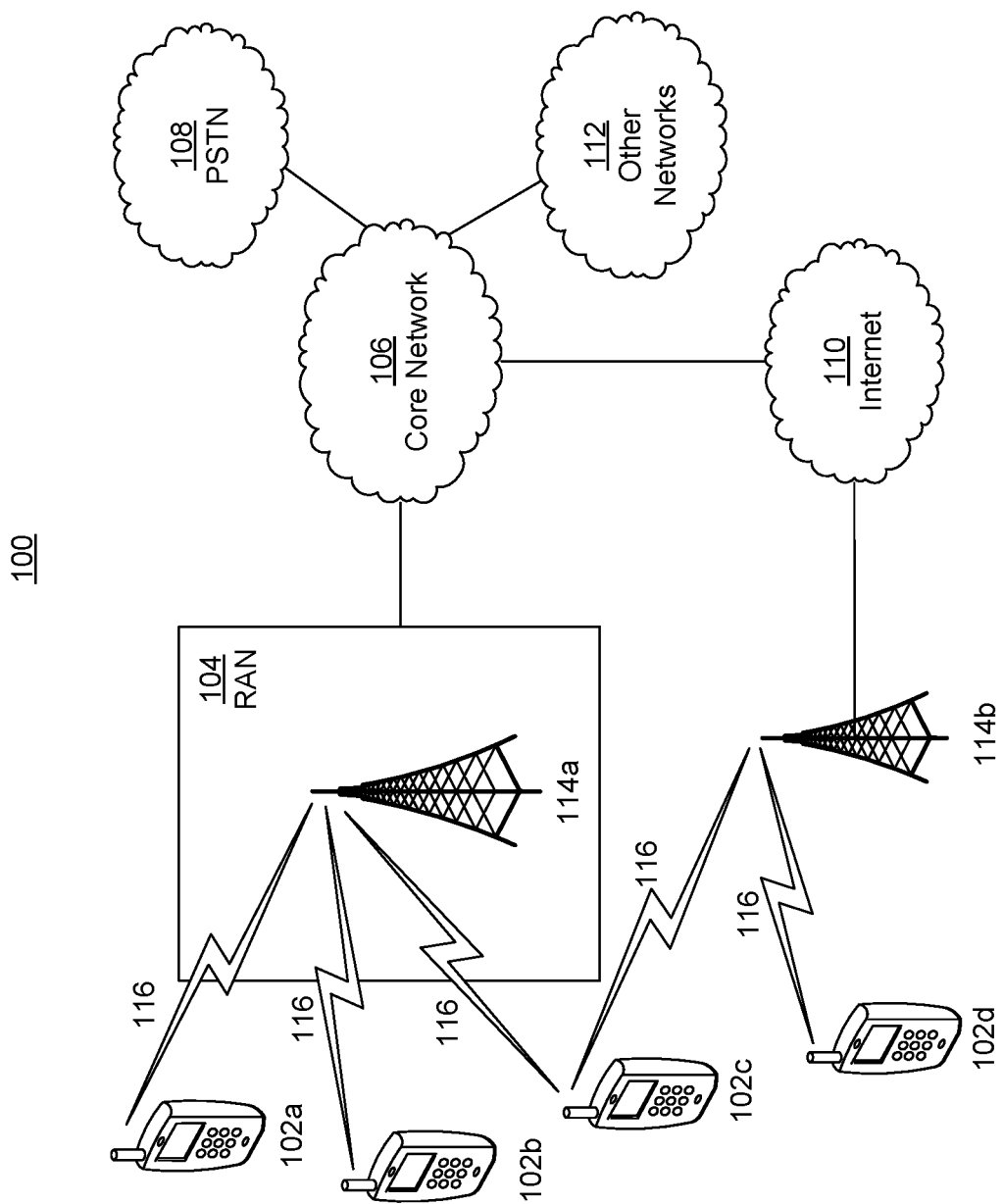
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
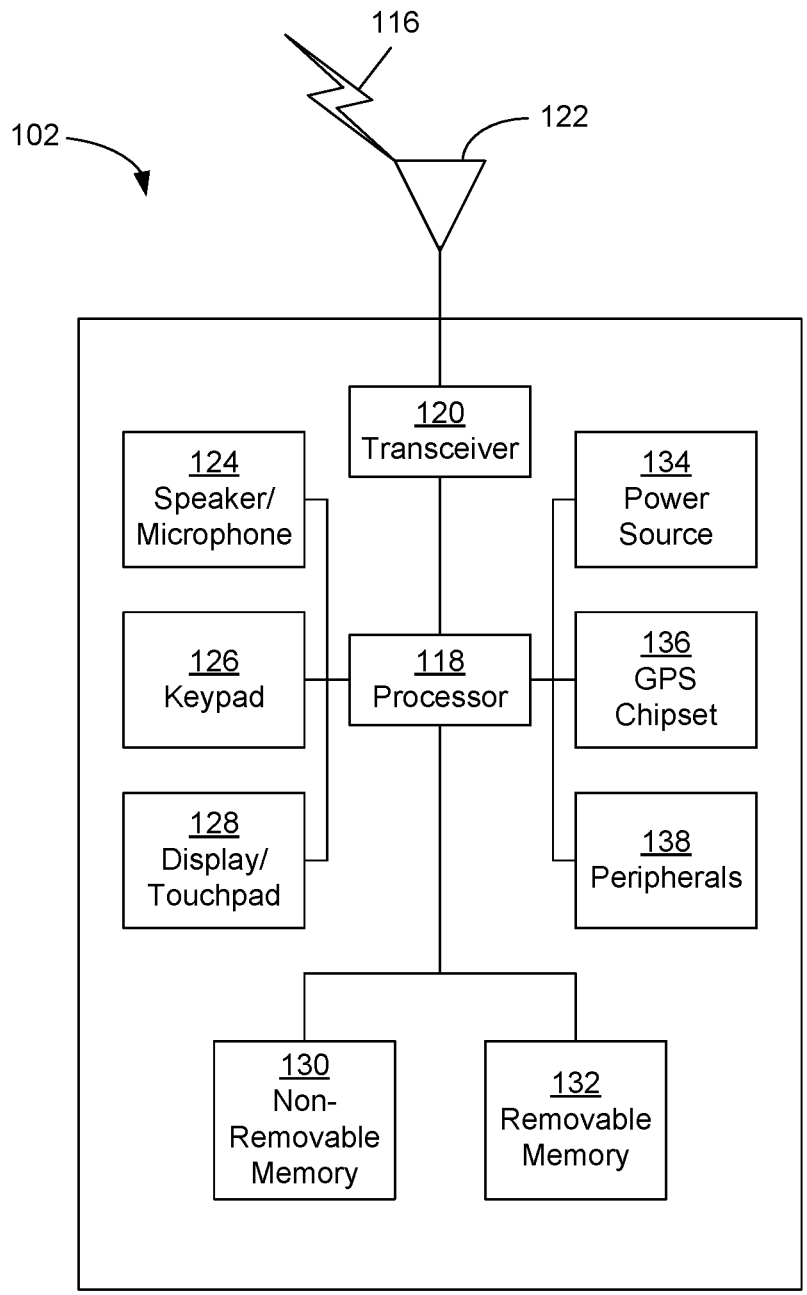
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
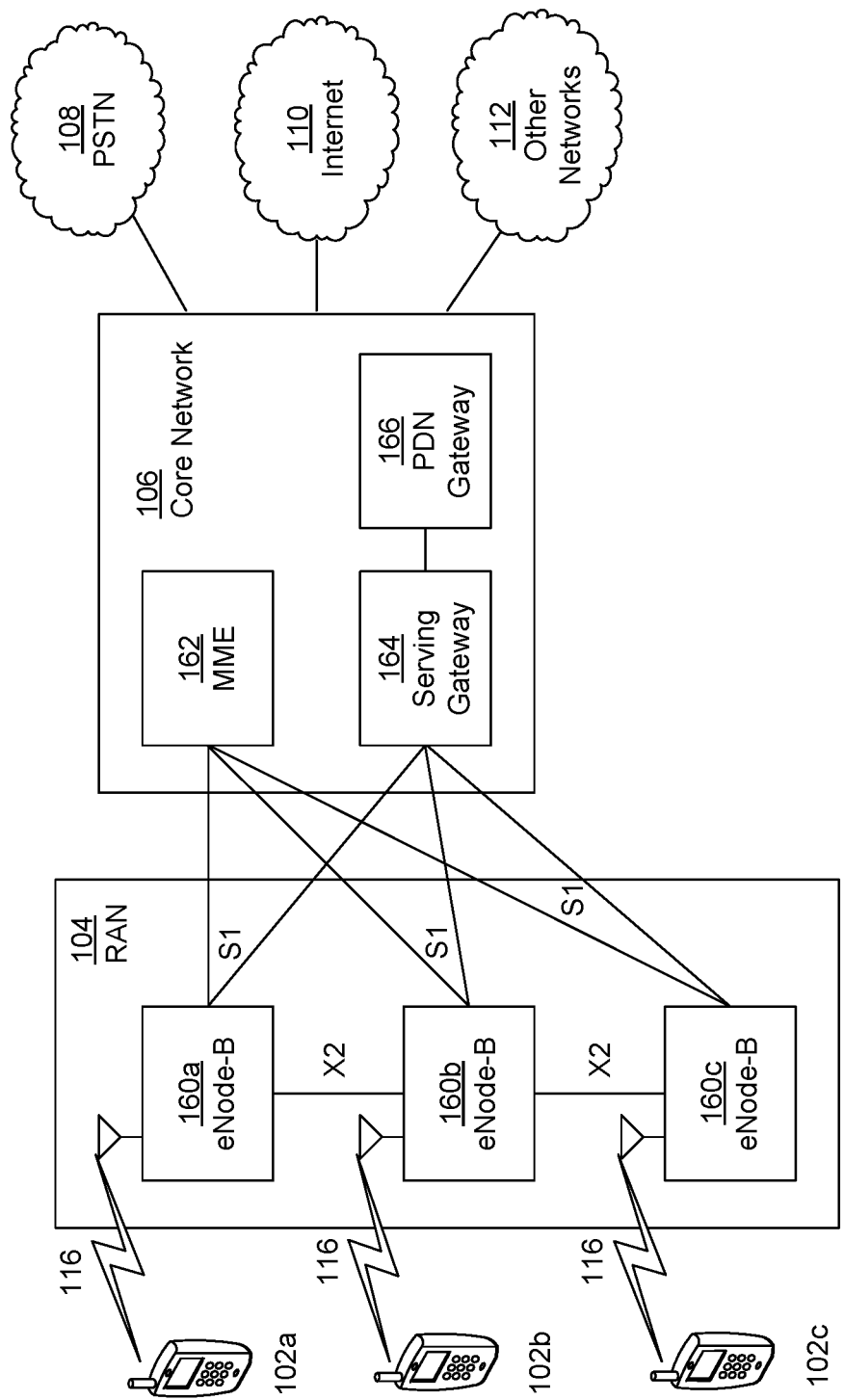
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Figure 10:
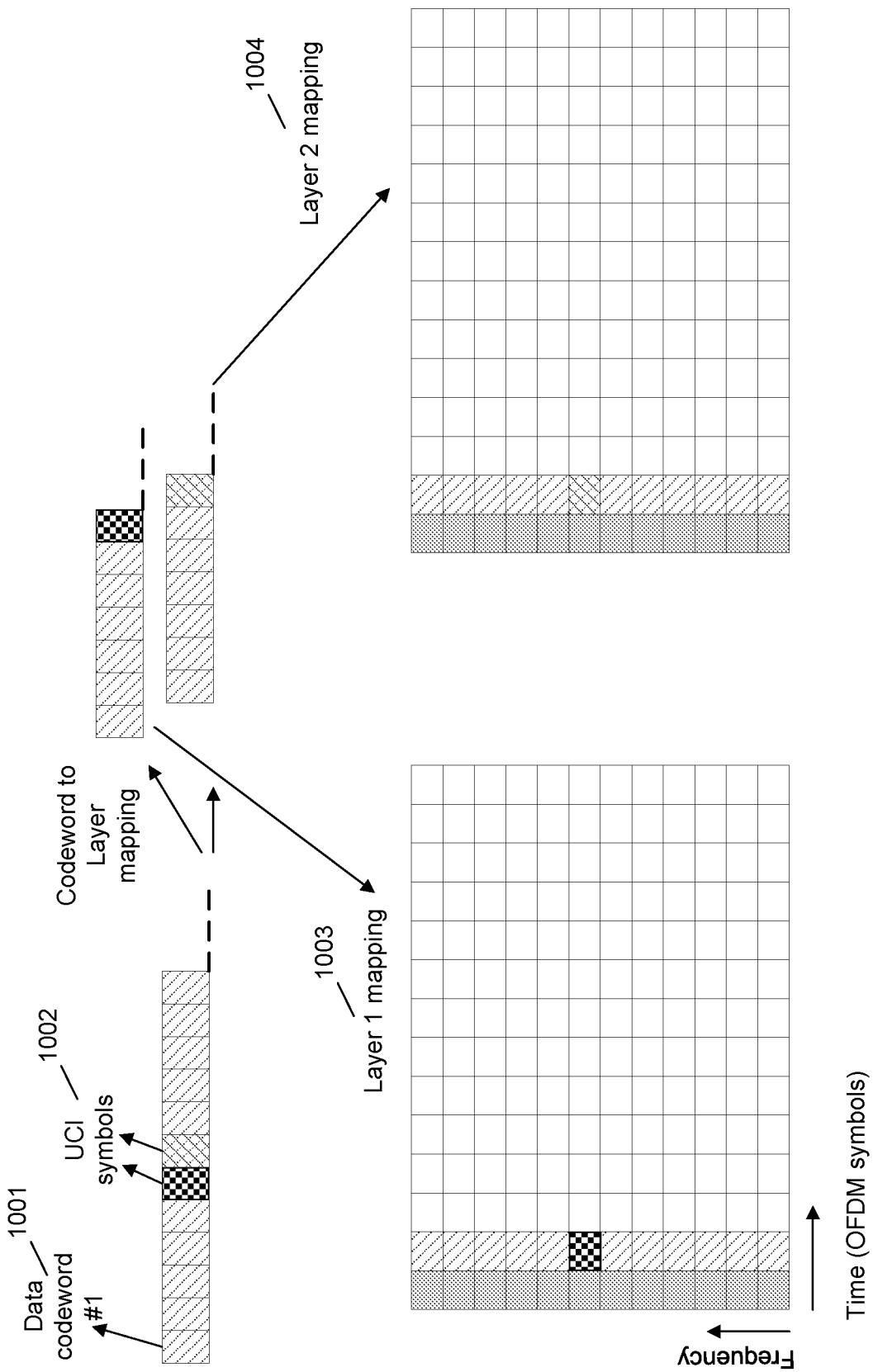
FIG. 10 is a diagram illustrating layer to subcarriers mapping wherein UCI is mapped to the same subcarriers, according to embodiments.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
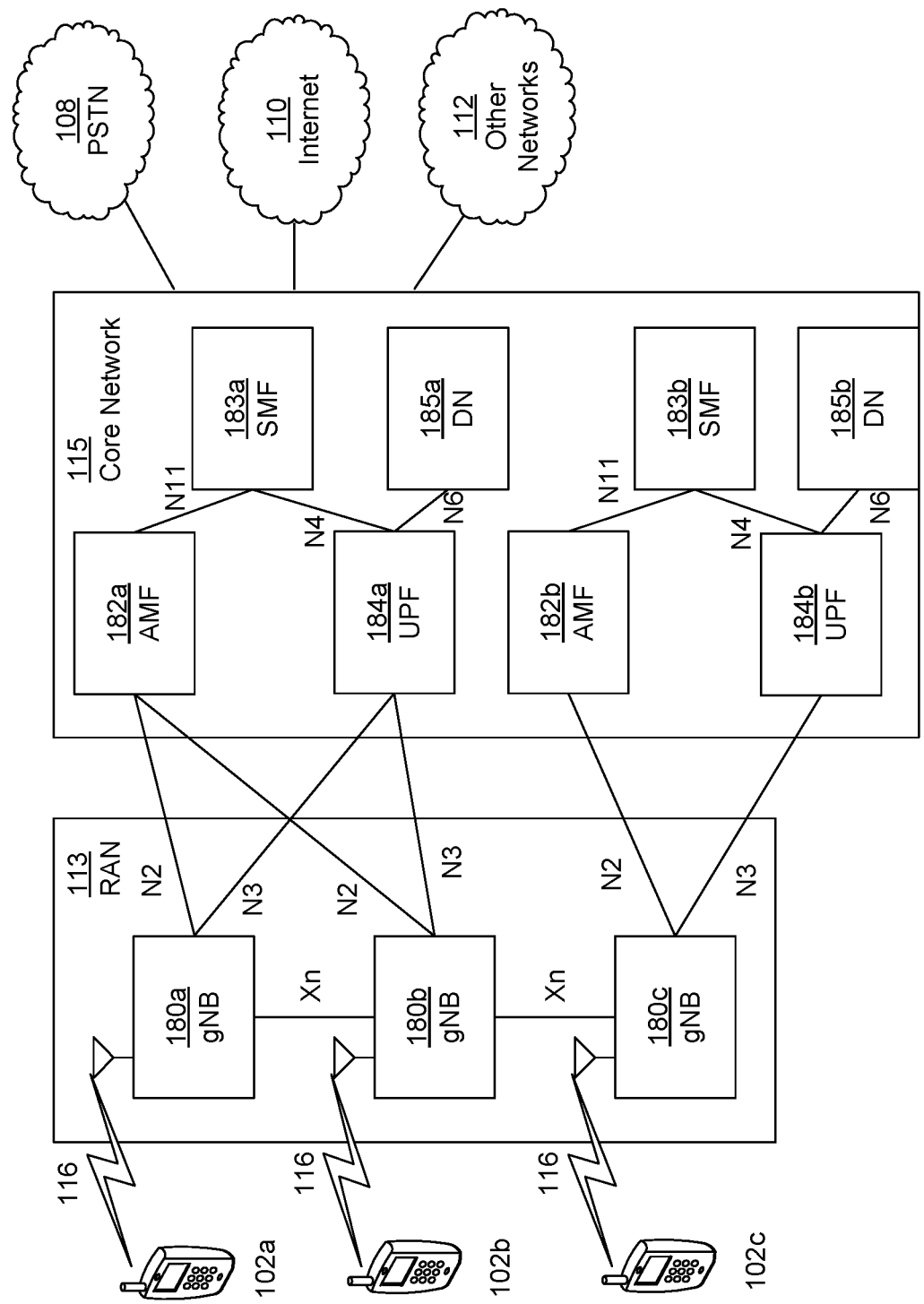
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Although the WTRU is described in FIGS. 1-4 as a wireless terminal, it is contemplated that in certain representative embodiments such a terminal may use (e.g., temporarily or permanently) wired communication interfaces with the communication network.

The design of the next generation of wireless systems is currently underway in the academia, industry, regulatory and standardization bodies. The IMT-2020 Vision sets the framework and overall objectives for the development of the next generation of wireless systems. To address an anticipated increase in wireless data traffic, demand for higher data rates, low latency and massive connectivity, the IMT-2020 Vision defines the main use cases that drive fifth generation (5G) design requirements: enhanced mobile broadband (eMBB), ultra-reliable low latency communications (URLLC), and massive machine type communications (mMTC). These use cases have widely different targets on peak data rates, latency, spectrum efficiency, and mobility.

Although the IMT-2020 Vision indicates that not all of the key capabilities are equally important for a given use case, flexibility may be built into the 5G designs, for example, in order to enable meeting expected use-case specific requirements and support multiple services. The air interface, specifically the physical (PHY) layer waveform, is one of a number of key components for new 5G technology. In this regard, 3GPP is conducting research and development for a new radio and/or new radio access technology (collectively referred to as "NR") for the advanced or next generation (e.g., 5G) wireless communication system in consideration of the main use cases and a variety of other/different applications along with their various use, need, and/or deployment scenarios and attendant (e.g., mandated specific) performance measurements, metrics, and/or requirements thereof.

In a communication network, control signaling may be transmitted via an uplink control channel. For example, in the case of Long Tem Evolution (LTE), uplink Layer 1 and/or Layer 2 control signaling may be transmitted in a Physical Uplink Control Channel (PUCCH). This control signaling (e.g., data, information, message, etc.) may include any of the following: Channel Quality Information (CQI), MIMO feedback, Scheduling Requests (SR), or Hybrid Automatic Repeat Request (HARQ) Acknowledgement/Negative Acknowledgement (ACK/NACK), or any other similar and/or suitable type of Layer 1 and/or Layer 2 signaling.

LTE transmissions may include transmitting any of a PUCCH transmission and a Physical Uplink Shared Channel (PUSCH) transmission. In order to avoid fragmenting Resource Blocks (RBs) available for a PUSCH transmission, for example, the PUCCH transmission: (1) may be for RBs at the edge of a channel bandwidth and/or (2) may span an entire slot. A resource block may include any number of resource elements (REs), and a RE may be referred to as a resource, an element, a time-frequency resource and/or element, etc. For an LTE transmission having a given total transmission power, the narrow bandwidth allocated to the PUCCH in a slot (e.g., each slot; only a single resource block) may maximize the power per subcarrier. Various PUCCH formats may be defined based on link performance and multiplexing capacity of a range of uplink control payloads. For example, Format 1/1a/1b may be implemented to carry 1 to 2 bits of control information and Format 2/2a/2b may be capable of conveying 20-22 coded bits of control information.

When simultaneous uplink PUSCH data and control signaling is scheduled for a UE/WTRU, the control signaling may be multiplexed together with the data prior to the DFT spreading, in order to preserve the single-carrier low Cubic Metric (CM) property of the uplink transmission. As such, the uplink control channel, e.g., the PUCCH, may be used by a UE/WTRU to transmit control signaling (e.g., any necessary control signaling) in subframes (e.g., only in subframes) in which the UE/WTRU has not been allocated any RBs for PUSCH transmission. The PUSCH may be used to carry the control information, wherein some of the resources allocated for PUSCH transmission are used to transmit control information.

In the case of New Radio (NR), physical uplink control signaling may be used to carry any of a HARQ ACK, a Channel State Information (CSI) report (e.g., including beamforming information), and a scheduling request (SR). Moreover, NR may support two ways of transmitting a NR uplink (UL) control channel: a short duration transmission and a long duration transmission. In the case of transmitting the UL control channel in a short duration transmission, control signaling is transmitted around the last transmitted UL symbol(s) of a slot. In the case of a long duration transmission, the UL control signaling may be transmitted over multiple UL symbols to improve coverage. In the case of a short duration transmission of the UL control channel, which may be referred to as a short PUCCH, both time division multiplexing (TDM) and/or frequency division multiplexing (FDM) with UL data channel within a slot may be performed. In the case of a long duration transmission of the UL control channel, which may be referred to as a long PUCCH, FDM (e.g., only FDM) with UL data channel within a slot may be allowed.

In the case of NR using orthogonal frequency division multiplexing (OFDM) and Discrete Fourier Transform (DFT)-spread-OFDM (DFT-s-OFDM) waveforms, techniques to support Uplink Control Information (UCI) transmission on PUSCH resources may be implemented.

According to embodiments, as discussed herein, ACK/NACK symbols may refer to coefficients used to transmit the ACK/NACK information. For example, ACK/NACK bits may be encoded and modulated such that the modulation symbols may be referred to as ACK/NACK symbols, and/or the ACK/NACK bits may be modulated and the modulation symbols may be multiplied with a sequence, where each coefficient of the multiplied sequence may be referred to as an ACK/NACK symbol. Similar definitions may hold for other types of control information. A transmission time interval (TTI) may refer to the time it takes to transmit a pre-defined number of OFDM (or DFT-s-OFDM) symbols. For example, a TTI may be a slot, a subframe, where a slot may consist of 7 OFDM symbols.

Uplink Control Information (UCI) Transmission in PUSCH for OFDM Waveform

According to embodiments, ACK/NACK symbols may be transmitted on the OFDM symbol(s) adjacent to demodulation reference symbols (DM-RSs), which may also be referred to as data demodulation reference symbols. According to embodiments, the number of OFDM symbols that carry the ACK/NACK symbols may correspond to the number of ACK/NACK symbols and may be signaled and/or configured by a network, for example, by a base station which may be referred to as any of an node B, an enhanced node B (eNB), a gNB, an access point (AP), and/or other similar network device/entity. According to certain embodiments, the number of OFDM symbols may be implicitly determined by the UE/WTRU based on specified parameters, for example, any of a PUCCH format, a number of ACK/NACK symbols, etc. For example, subcarrier k on OFDM symbols m+1, m+2, . . . m+K may be used to carry ACK/NACK symbols, wherein OFDM symbol m+1 could be the OFDM symbol that is adjacent to the DM-RS symbol, and K may be a parameter (e.g., a PUCCH format).

According to embodiments, rank indicator (RI) symbols may be transmitted on the OFDM symbol(s) adjacent to the DM-RS symbol. According to embodiments, the number of OFDM symbols that carry the RI symbols may correspond to the number of RI symbols and may be configured and/or signaled by the eNB, gNB, and/or other AP. According to certain embodiments, the number of OFDM symbols may be determined by the UE/WTRU based on any of the PUCCH format, the number of RI symbols, etc. As an example, subcarrier I on OFDM symbols m+1, m+2, . . . m+L may be used to carry the RI symbols where OFDM symbol m+1 could be the OFDM symbol adjacent to the DM-RS symbol, and L is a parameter (e.g., a PUCCH format).

According to embodiments, the DM-RS may be front-loaded (e.g., it may be transmitted before the transmission of user data (e.g., before PUSCH transmission). There may be one or more DM-RS symbols. According to embodiments, in the case of multiple DM-RS symbols, the UCI data transmission may commence after the last DM-RS symbol of the front loaded DM-RS. According to embodiments, other types of UCI, such as CQI, may be placed on a specified set of subcarriers over a number of OFDM symbols. The number of OFDM symbols may span a part or a whole of a TTI. These subcarriers may be interleaved over the whole or partial bandwidth assignment, for example, to attain frequency diversity.

The placement of the ACK/NACK symbols into the PUSCH may be achieved by any of the following methods. According to embodiments, a first method may include the ACK/NACK symbols puncturing the PUSCH. For example, ACK/NACK symbols may replace (e.g., puncture) data modulation symbols that are to be transmitted in the PUSCH (e.g. 16 QAM symbols). According to embodiments, a second method may include the PUSCH being rate-matched around the ACK/NACK symbols. According to embodiments, in the case of rate matching, the PUSCH resources to be loaded with ACK/NACK symbols are not counted toward the number of available resources for PUSCH transmission.

According to embodiments, a decision regarding the above methods, e.g., whether (a) the ACK/NACK symbols puncture the PUSCH and/or (b) the PUSCH is rate-matched around the ACK/NACK symbols, may depend on any of the following: (1) a number of OFDM symbols available for PUSCH within a TTI; (2) a number of total PUSCH resources (e.g., the number of OFDM symbols available for PUSCH transmission within a TTI multiplied by the number of allocated subcarriers); and/or (3) a number of ACK/NACK symbols to be transmitted in the PUSCH.

According to embodiments, as discussed herein, n may refer to the number of OFDM symbols available for PUSCH, k may refer to the number of allocated subcarriers, and m may refer to the number of ACK/NACK symbols. According to embodiments, any of the following rules may apply (e.g., to the above discussed methods): (1) the ACK/NACK symbols may puncture the PUSCH if m<M, and if m≥M, the PUSCH may be rate-matched around the ACK/NACK symbols, the parameter M may be configured by the eNB, gNB, and/or other AP, and/or it may be determined according to the PUCCH format; (2) If n<N, the PUSCH may be rate-matched around the ACK/NACK symbols, the parameter N may be configured by the eNB, gNB, and/or other AP, and/or it may be determined by the PUCCH format, if n≥N and m<M, the ACK/NACK symbols may puncture the PUSCH symbols, or if n≥N and m≥M, the PUSCH is rate-matched around the ACK/NACK symbols; and/or (3) If nk<L, the PUSCH may be rate-matched around the ACK/NACK symbols, the parameter L may be configured by the eNB, gNB, and/or other AP and/or it may be determined by the PUCCH format, if nk≥L, the ACK/NACK symbols may puncture the PUSCH symbols and if m<M, or if m≥M, the PUSCH may be rate-matched around the ACK/NACK symbols.

According to embodiments, ACK/NACK symbols may puncture a PUSCH. For example, in a case where a ratio of the number of ACK/NACK symbols to the number of modulation symbols in a code block is below a threshold, ACK/NACK symbols may puncture a PUSCH. According to embodiments, there may be a case where Z number of information bits are encoded to generate bZ coded bits, wherein b may be a rational number. In such a case, the bZ coded bits may be modulated with a modulation scheme, such as QAM modulation, to generate modulation symbols.

According to embodiments, modulation symbols may be transmitted on a set of resources of a PUSCH, for example, allocated resources of the PUSCH that consist of a number of subcarriers over any number of OFDM symbols, and the coding rate may be 1/b. According to embodiments, in a case where some of the modulation symbols are punctured and replaced by ACK/NACK symbols, an effective coding rate may be larger than 1/b. According to embodiments, in a case where an increase in the coding rate when puncturing is used is less than a threshold value (for example, $\Delta<\beta$, wherein $\Delta$ is an increase in the effective coding rate and $\beta$ is a threshold value), then ACK/NACK symbols may puncture the PUSCH, otherwise the PUSCH may be rate-matched around the ACK/NACK symbols. According to embodiments, $\Delta$ and $\beta$ may be configured by a central controller. According to embodiments, the PUSCH may be rate-matched around the RI and/or CQI symbols.

Figure 2:
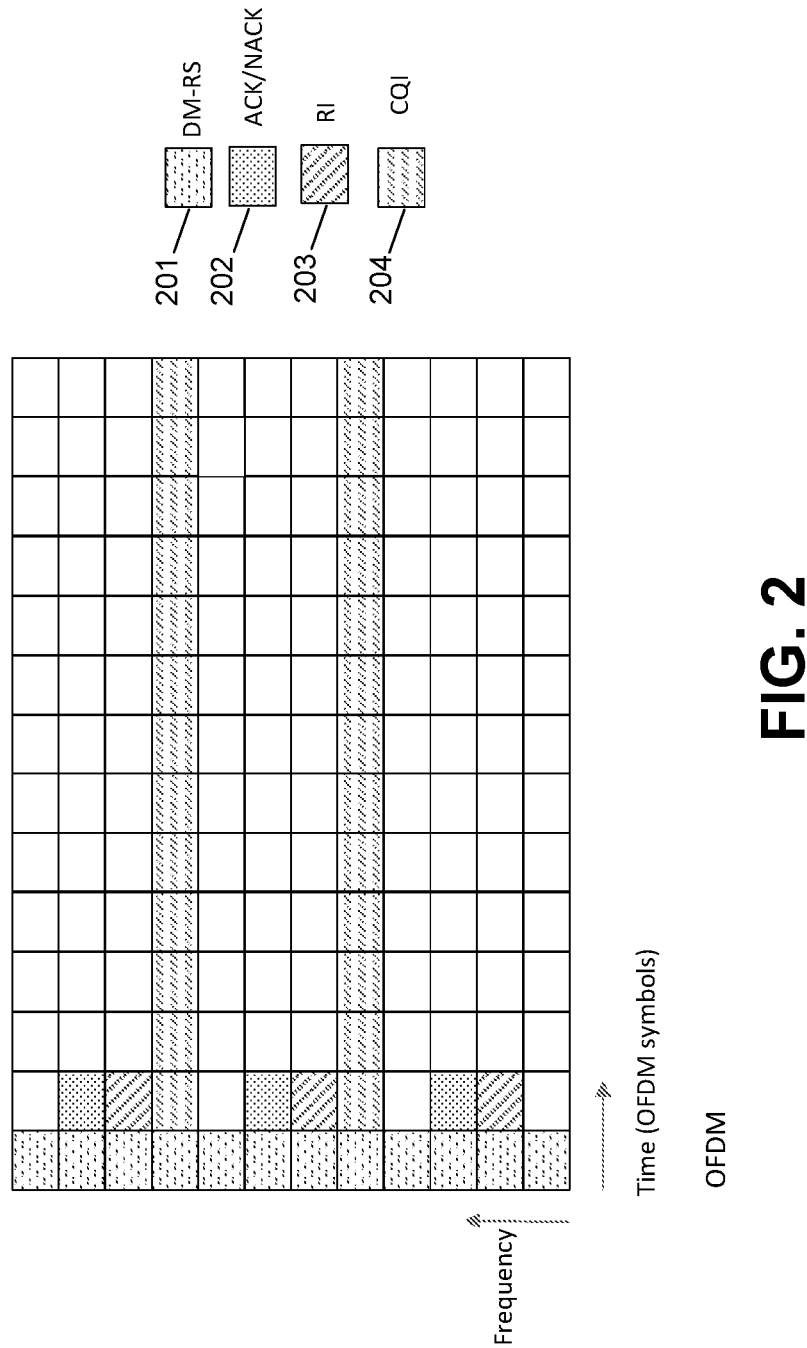
FIG. 2 is a diagram illustrating UCI transmission in a PUSCH according to embodiments.
Figure 3:
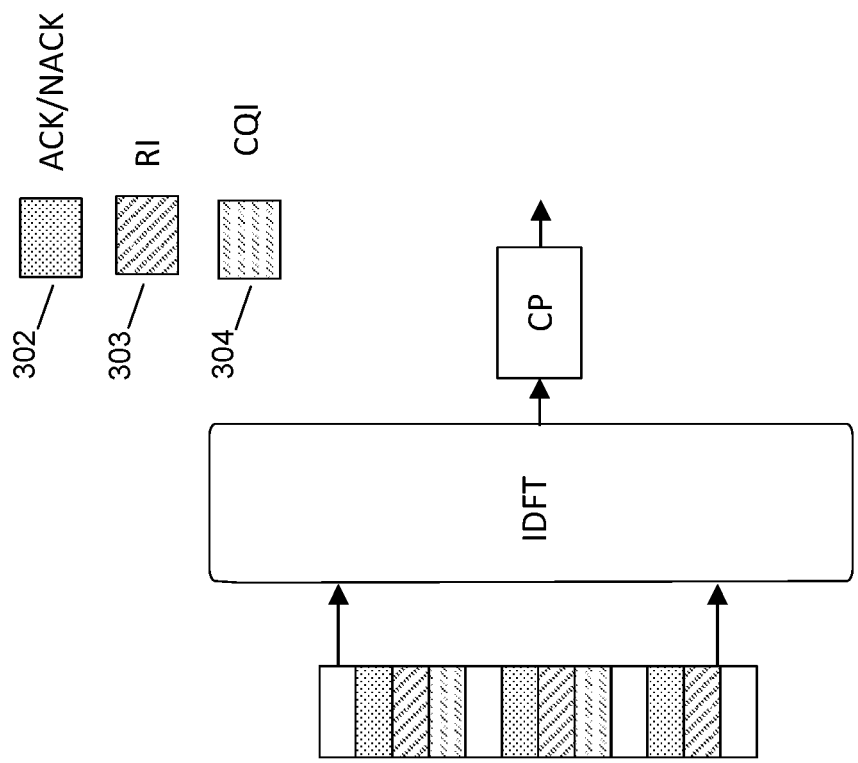
FIG. 3 is a diagram illustrating an OFDM waveform generator according to embodiments.

FIG. 2 is a diagram illustrating UCI transmission in a PUSCH according to embodiments; and FIG. 3 is a diagram illustrating an OFDM waveform generator according to embodiments.

Referring to FIG. 2, the x-axis denotes OFDM symbols, and the y-axis denotes subcarriers. According to embodiments, each resource, e.g., each OFDM symbol-subcarrier pair, has been allocated for PUSCH transmission, but some of the resources are used to carry UCI data instead of user data. According to embodiments, the ACK/NACK 202 and/or RI 203 symbols may be transmitted on the OFDM symbol(s) adjacent to the last DM-RS 201 of the front-loaded DM-RS 201. Although there is one OFDM symbol allocated to DM-RS 201 in FIG. 2, the present disclosure is not limited there to, and there may be multiple OFDM symbols used as DM-RS 201. According to embodiments, the CQI 204 may be transmitted on several OFDM symbols following the DM-RS 201. The UCI symbols may be transmitted on any of: adjacent subcarriers, non-adjacent subcarriers, and/or subcarriers wherein groups of subcarriers may not be adjacent but subcarriers within a group may be adjacent.

According to embodiments, the OFDM waveform generator of FIG. 3 may be used to generate the second OFDM symbol of FIG. 2 in which the ordered PUSCH and UCI symbols are inserted into a set of IDFT inputs, wherein each input corresponds to a subcarrier.

Figure 4:
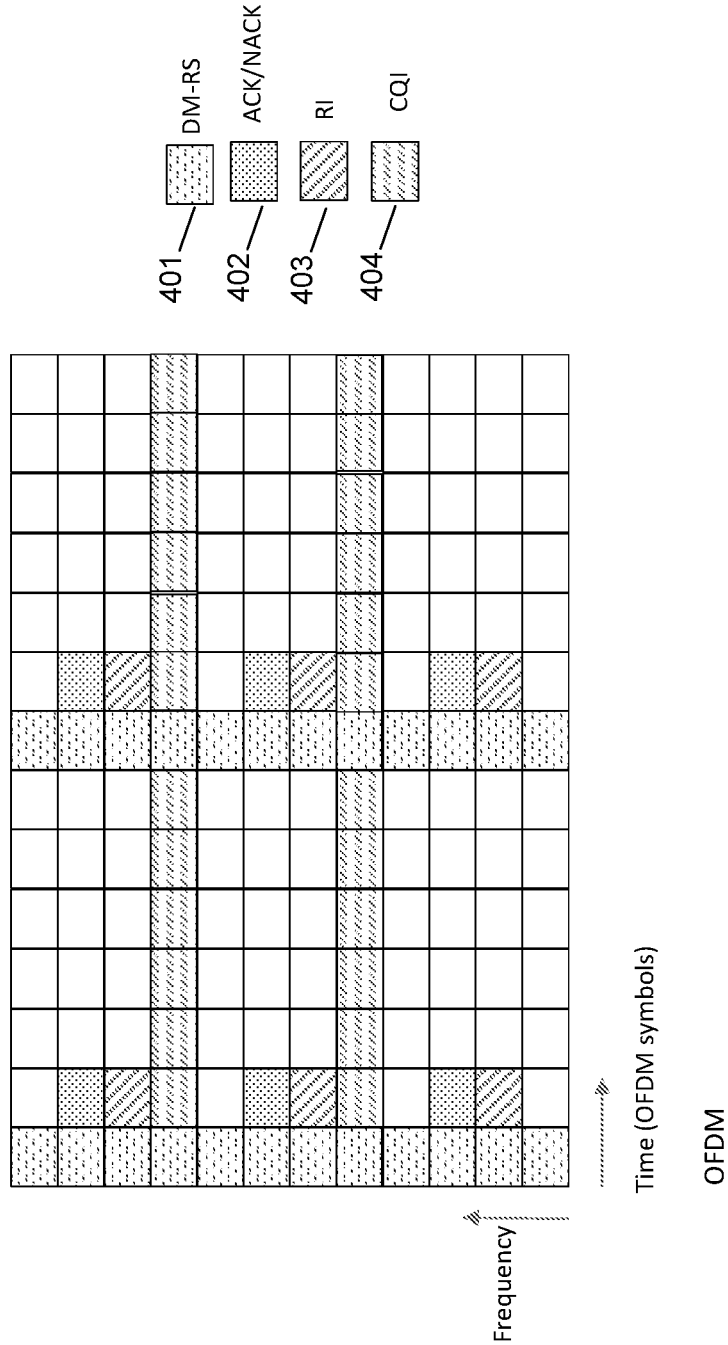
FIG. 4 is a diagram illustrating UCI transmission with additional DM-RS using OFDM according to embodiments.

FIG. 4 is a diagram illustrating UCI transmission with additional DM-RS using OFDM according to embodiments.

According to embodiments, in addition to or in lieu of the front-loaded DM-RS, DM-RS 401 symbols may be configured for transmission within a TTI. According to embodiments, the additional DM-RS 401 symbols may improve channel estimation accuracy, for example, when mobility is high. In such a case, any of the ACK/NACK 203 and/or RI 403 symbols may be placed around the front-loaded DM-RS 401 and the additional DM-RS symbols 401, as shown in FIG. 4.

In the case illustrated in FIG. 4, any of the following may apply: (1) the ACK/NACK 402 symbols to be transmitted on the OFDM symbols adjacent to the front-loaded DM-RS 401 may be repeated on the OFDM symbols adjacent to the additional DM-RS 401 symbol, if more than one additional DM-RS 401 is configured, the ACK/NACK 402 symbols may be transmitted on OFDM symbols adjacent to at least one of the additional DM-RS 401 symbols; and/or (2) the total number of ACK/NACK 402 symbols may be divided into a set of groups and each group may be transmitted on the OFDM symbols adjacent to one of the DM-RS 401 symbols, if more than one additional DM-RS 401 is configured, the ACK/NACK 402 symbols may be transmitted on OFDM symbols adjacent to at least one of the additional DM-RS 401 symbols.

Figure 5:
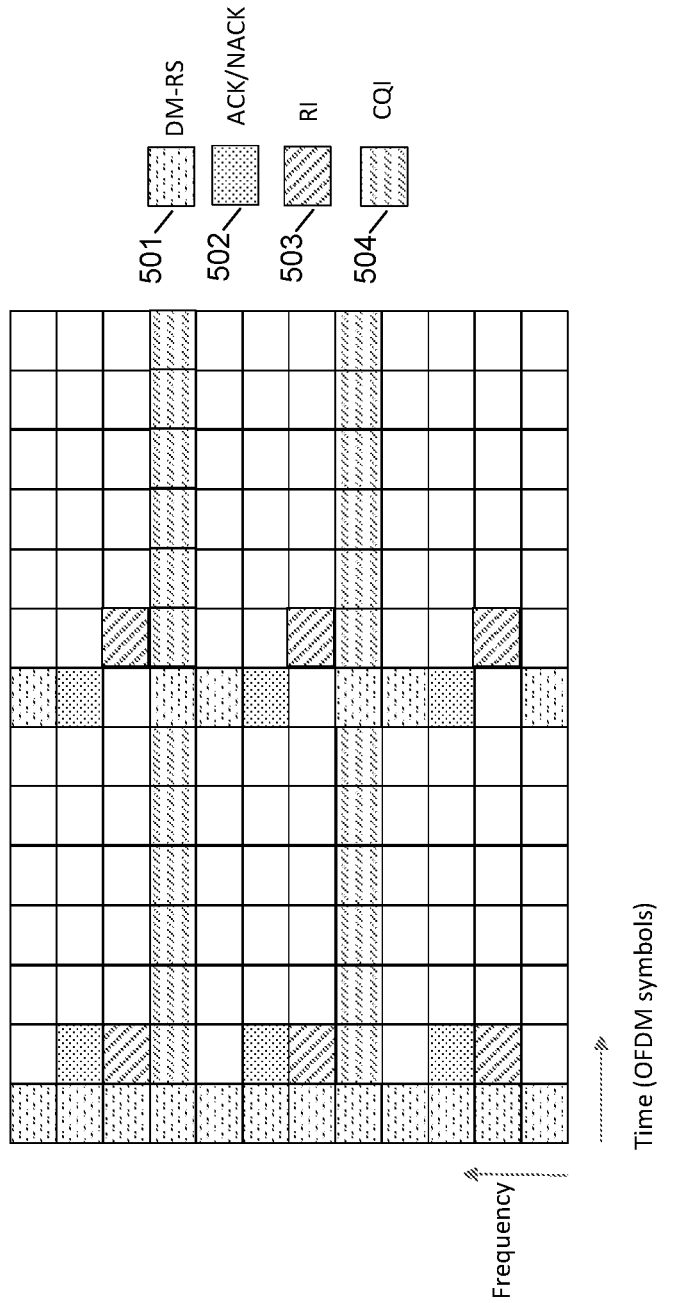
FIG. 5 is a diagram illustrating another UCI transmission with additional DM-RS using OFDM according to embodiments.

FIG. 5 is a diagram illustrating another UCI transmission with additional DM-RS using OFDM according to embodiments.

According to embodiments, in a case where additional reference symbols are multiplexed with other types of symbols (e.g., symbols used for PUSCH transmission) in an OFDM symbol as shown in FIG. 5, the ACK/NACK 502 and/or the RI 503 symbols may be placed in the same OFDM symbol as the DM-RS 501.

Figure 6:
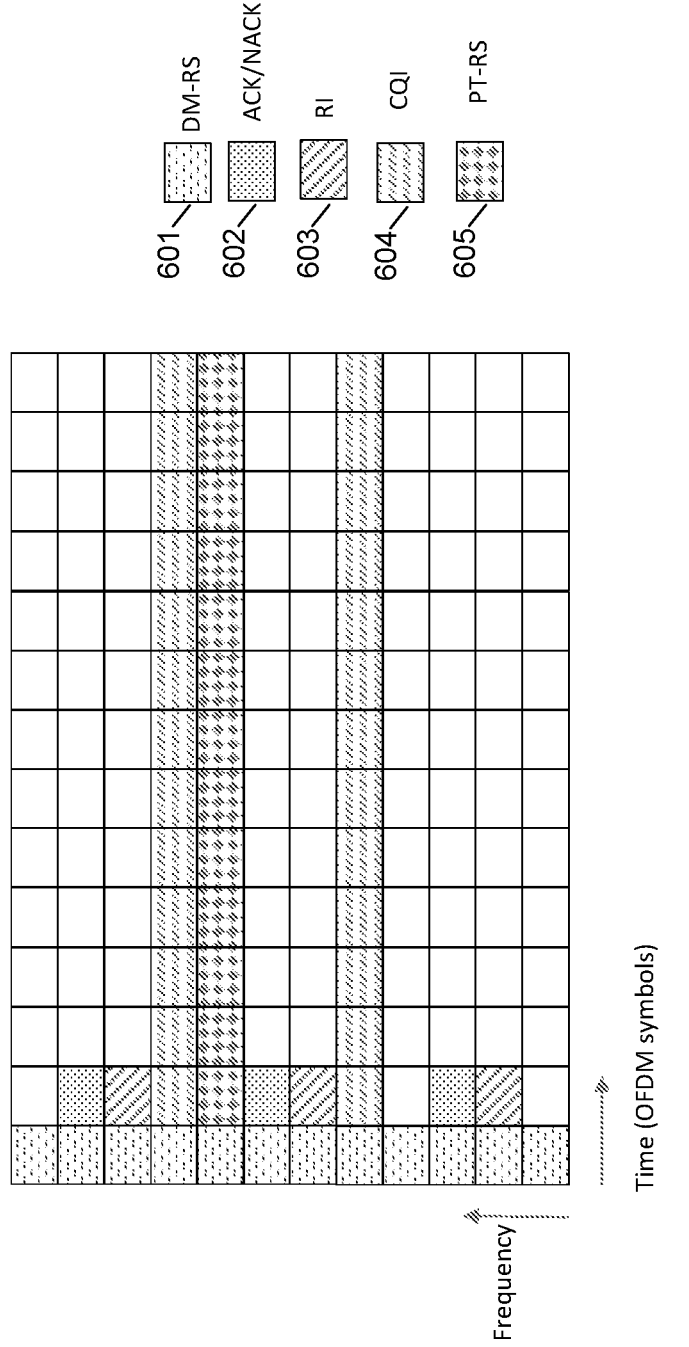
FIG. 6 is a diagram illustrating another UCI transmission with additional PT-RS using OFDM according to embodiments.

FIG. 6 is a diagram illustrating another UCI transmission with additional PT-RS using OFDM according to embodiments.

According to embodiments, certain reference symbols, for example a Phase Tracking Reference Signal (PT-RS) 605 symbol that may be used to estimate and track phase noise, may be dynamically used (e.g., PT-RS transmission is enabled/turned-on) and transmitted on certain subcarriers of specific OFDM symbols, as shown in FIG. 6. Although the techniques discussed below are presented in the context of PT-RS, the present disclosure is not limited thereto, and the techniques are applicable to other types of RSs. When PT-RS transmission is enabled, any of the following methods may apply: (1) the UCI symbols may be punctured by the PT-RS 605; (2) the UCI symbols may be punctured by the PT-RS 605 if the UCI is not an ACK/NACK 602 and/or RI 603; (3) the PT-RS 605 may be punctured by the UCI; (4) the PT-RS 605 may be punctured by the UCI if the UCI is ACK/NACK 602 and/or RI 603; and/or (5) the subcarrier indices of any of the UCI or the PT-RS 605 may be shifted according to an established rule to prevent collision of the UCI and the PT-RS 605. For example, if subcarriers k, k+1 are to carry the UCI, and the PT-RS 605 is enabled (e.g., turned on) for subcarrier k, the UCI may be transmitted on subcarrier k+1, k+2; and/or PT-RS 605 may be transmitted on subcarrier k−1.

According to embodiments, the disclosed techniques may similarly be applicable to transmission schemes where a TTI may be shared for downlink and uplink transmission. In the case of such mixed transmission time intervals, the disclosed schemes may apply to the uplink transmission part of a mixed transmission time interval.

UCI Transmission with MIMO

As referred to herein, a data codeword may refer to a data symbol that is coded and modulated for transmission in a physical uplink shared channel (PUSCH). Further, a data codeword may be interchangeably referred to as a codeword. According to embodiments, a data codeword, or codeword, may be associated with (e.g., may include) any number of layers based on a transmission rank of a PUSCH and/or a number of data codewords for the PUSCH transmission. As referred to herein, a UCI codeword may refer to a control information symbol that is coded and modulated for transmission in a PUSCH. However, the present disclosure is not limited thereto, and a control information symbol may be coded and modulated for transmission in any of a PUSCH, a physical uplink control channel (PUCCH), and any other similar or suitable channel.

According to embodiments, a PUSCH may be transmitted over (e.g., via, using) any number of spatial layers using any number of antennas. According to embodiments, a data codeword (e.g., one codeword) may be divided into any number of streams and, for example, each stream may be transmitted over a spatial layer (e.g., a respective spatial layer). According to embodiments, more than one data codeword (e.g., multiple codewords) may be divided into multiple streams and, for example, each stream may be transmitted over a spatial layer (e.g., a respective spatial layer). According to embodiments, a spatial layer (e.g. one layer) may be associated with (e.g., limited to carrying) only data symbols corresponding to a single codeword. However, the present disclosure is not limited thereto, and a spatial layer may be associated with symbols corresponding to any number of codewords.

According to embodiments, a number of codewords for transmission (for example, the number of data codewords for a PUSCH transmission) may be determined based on a number of layers for (e.g., associated with) a PUSCH transmission. According to embodiments, the number of layers per codeword may be determined based on the number of layers for a PUSCH transmission. For example, in a case of more than one codeword, one or more of the layers for a PUSCH transmission may be associated with each codeword. According to embodiments, a codeword to layer mapping may be determined according to any of a predefined rule, a configuration, downlink control information (DCI), an indicator, or other explicit and/or implicit information. According to embodiments, a number of layers for a PUSCH transmission may be indicated by a network, for example, using any of broadcast information, DCI, configuration information, or other similar information and/or signaling.

According to embodiments, a WTRU may transmit UCI in any of a PUSCH or a PUCCH in a slot (e.g., a subframe), such as the same slot (e.g., the same subframe). According to embodiments, a WTRU may be configured, scheduled, informed, indicated, etc., to transmit a PUSCH and a PUCCH in a same slot. According to embodiments, the WTRU may transmit the UCI according to any of a waveform, a transmission rank, or a transmission power. For example, the WTRU may transmit the UCI in a channel selected according to any of a waveform, a transmission rank, or a transmission power.

In the case of a waveform, the WTRU may transit UCI on a PUCCH if the WTRU is configured (e.g., determines) to use a first waveform (e.g., CP-OFDM) for the uplink transmission (e.g., PUSCH and/or PUCCH), and may transmit the UCI on a PUSCH if the WTRU is configured (e.g., determines) to use a second waveform (e.g., DFT-s-OFDM) for the uplink transmission. In the case of transmission rank, the WTRU may transmit UCI on a PUSCH if the WTRU is configured (e.g., determines) to transmit a PUSCH with a rank which is below a predefined threshold; otherwise, the WTRU may transmit UCI on a PUCCH, or vice-versa. In the case of transmission power, the WTRU may transmit UCI on a PUCCH if the UE is configured (e.g., indicated, or determines) to transmit a PUSCH with a transmission power exceeding a predefined threshold; otherwise, the UE may transmit UCI on a PUSCH, or vice-versa. According to embodiments, in a case where a WTRU transmits UCI on a PUCCH, the WTRU may transmit a PUSCH and a PUCCH simultaneously (for example, in the same slot) or may drop (e.g., not transmit) a PUSCH in the slot.

According to embodiments, UCI may be transmitted in a PUSCH with multiple streams, or in other words, UCI associated with multiple streams may be transmitted in a PUSCH. According to embodiments, UCI symbols associated with (e.g., belonging to) a UCI codeword (e.g., any of encoded and modulated ACK/NACK bits, encoded and modulated RI bits, or jointly encoded and modulated ACK/NACK and RI bits) may be transmitted in the PUSCH by rate matching a data codeword (e.g., by transmitting the data codeword using the available resources). According to embodiments, in the case of rate matching, a length of a codeword (e.g., the codeword of the PUSCH transmission) may be adjusted to match the number of resources available for data transmission (e.g., the resources allocated for UCI transmission is not included in this number) over the duration of the transmission interval, for example, any of a slot or a subframe.

According to embodiments, in a case of more than one codeword (e.g., two or more data codewords exist), a set of UCI symbols (e.g., ACK/NACK UCI symbols) may be transmitted within more than one data codewords. For example, the two or more data codewords may be rate-matched around the same set of UCI symbols. According to embodiments, the UCI symbols may be repeated over data codewords, for example, according to a type of the UCI. According to embodiments, ACK/NACK (e.g., HARQ-ACK) and/or RI UCI symbols may be repeated over any of the multiple data codewords or layers. According to embodiments, CQI UCI symbols may be transmitted within one codeword or layer or any of multiple codewords or layers without repetition.

Figure 7:
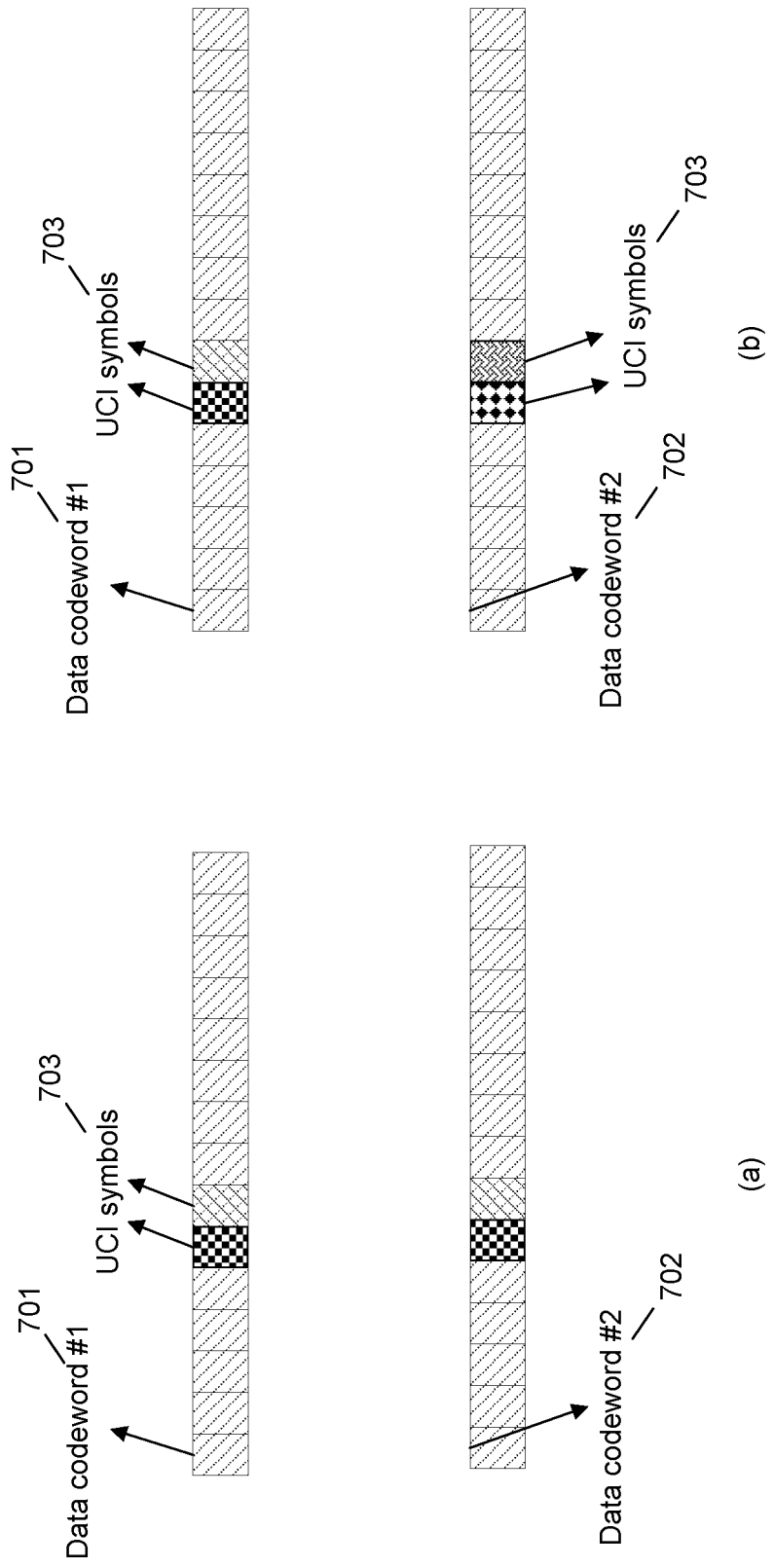
FIG. 7 is a diagram illustrating UCI and data codewords multiplexing options according to embodiments.

FIG. 7 is a diagram illustrating UCI and data codewords multiplexing options according to embodiments.

Referring to FIG. 7, in case (a), the same UCI symbols 803 are multiplexed with the data codeword (or layer) symbols 701, 702, of the two data codewords (or layers). In the case (a), the two UCI symbols 703 may belong to the same UCI codeword (or layer), and may be ACK/NACK UCI. Referring to FIG. 7, in case (b), the UCI symbols 703 multiplexed with the data codeword #1 are different from the UCI symbols 703 multiplexed with the data codeword #2. In case (b), the four UCI symbols 703 may belong to the same UCI codeword, and may be CQI UCI.

Figure 8:
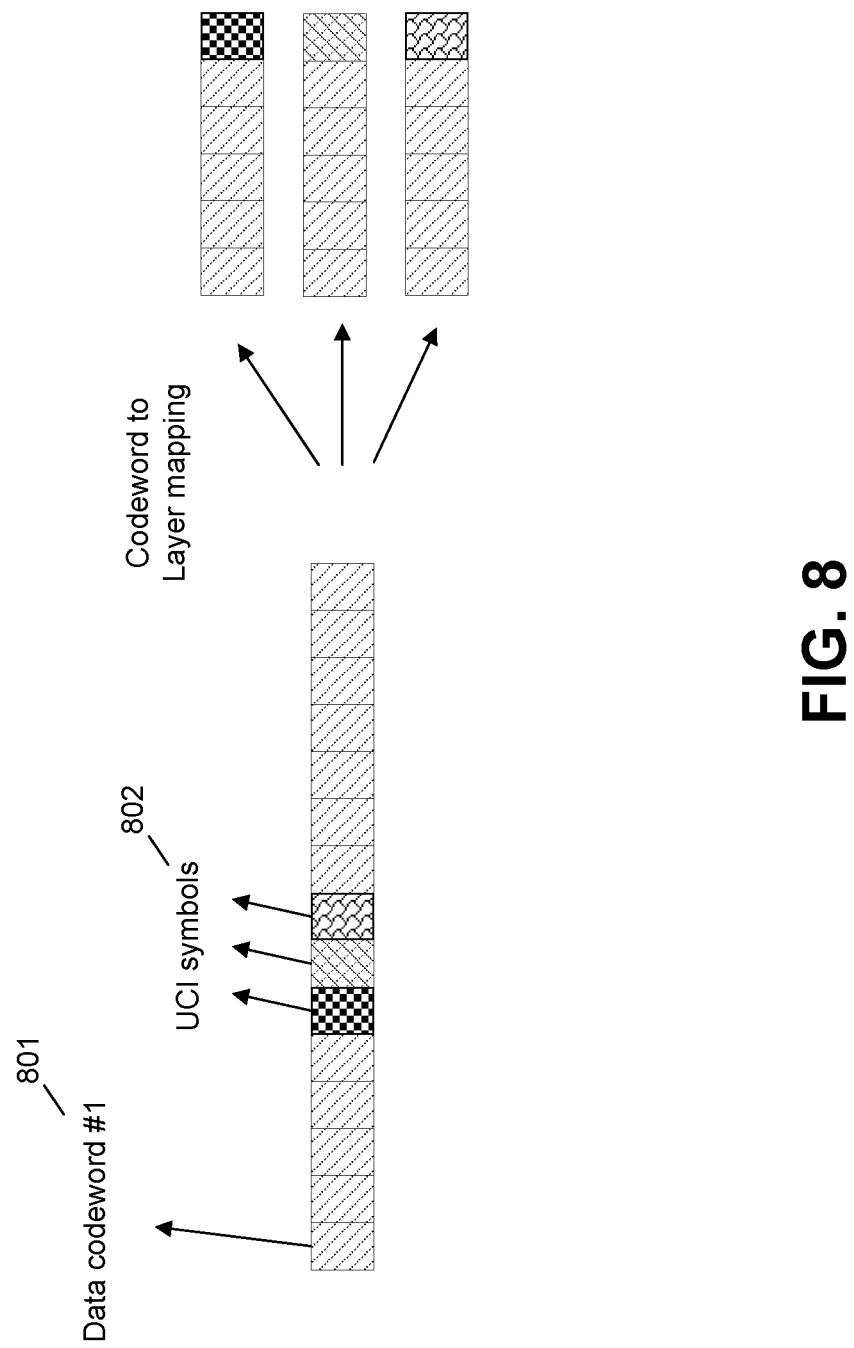
FIG. 8 is a diagram illustrating codeword to layer mapping according to embodiments.

FIG. 8 is a diagram illustrating codeword to layer mapping according to embodiments. According to embodiments, codewords (e.g., data codewords, UCI codewords) may be mapped (e.g., may need to be mapped) to spatial layers.

Referring to FIG. 8, multiplexed data, such as data codeword #1 symbols 801, and UCI codewords, such as UCI symbols 802, may be mapped to three spatial layers. According to embodiments, the mapping may be performed such that each spatial layer includes (e.g., has, contains) symbols from the UCI codeword. According to embodiments, a total number of UCI symbols N may be determined according to:

$$N=kM+L \quad \text{[Equation 1]},$$

wherein k is the number of spatial layers, M and L are integers, and L=mod(N, k). According to embodiments, each layer k may contain at least M UCI symbols, and the remaining L symbols may be distributed evenly among the L layers, or all L symbols may be assigned to a layer (e.g., one single layer).

According to embodiments, any number of UCI symbols may be repeated on multiple layers of any number of data codewords (e.g., of only one data codeword). For example, there may be a case where layers 1 to 4 are used to transmit data codeword #1, while layers 5 to 8 are used to transmit data codeword #2. According to embodiments, in such a case, UCI symbols may be repeated: (1) on any (e.g., all) of layers 1 to 4; (2) on any (e.g., all) of layers 5 to 8, or (3) on a group of layers including any layers from both 1 to 4 and 5 to 8. According to embodiments, a type of UCI may be used to determine whether UCI symbols are repeated over multiple layers of a codeword. For example, at least ACK/NACK and/or RI UCI symbols may be repeated over multiple layers. Further, according to embodiments, repetition of UCI symbols may reduce the length of a data codeword.

Figure 9:
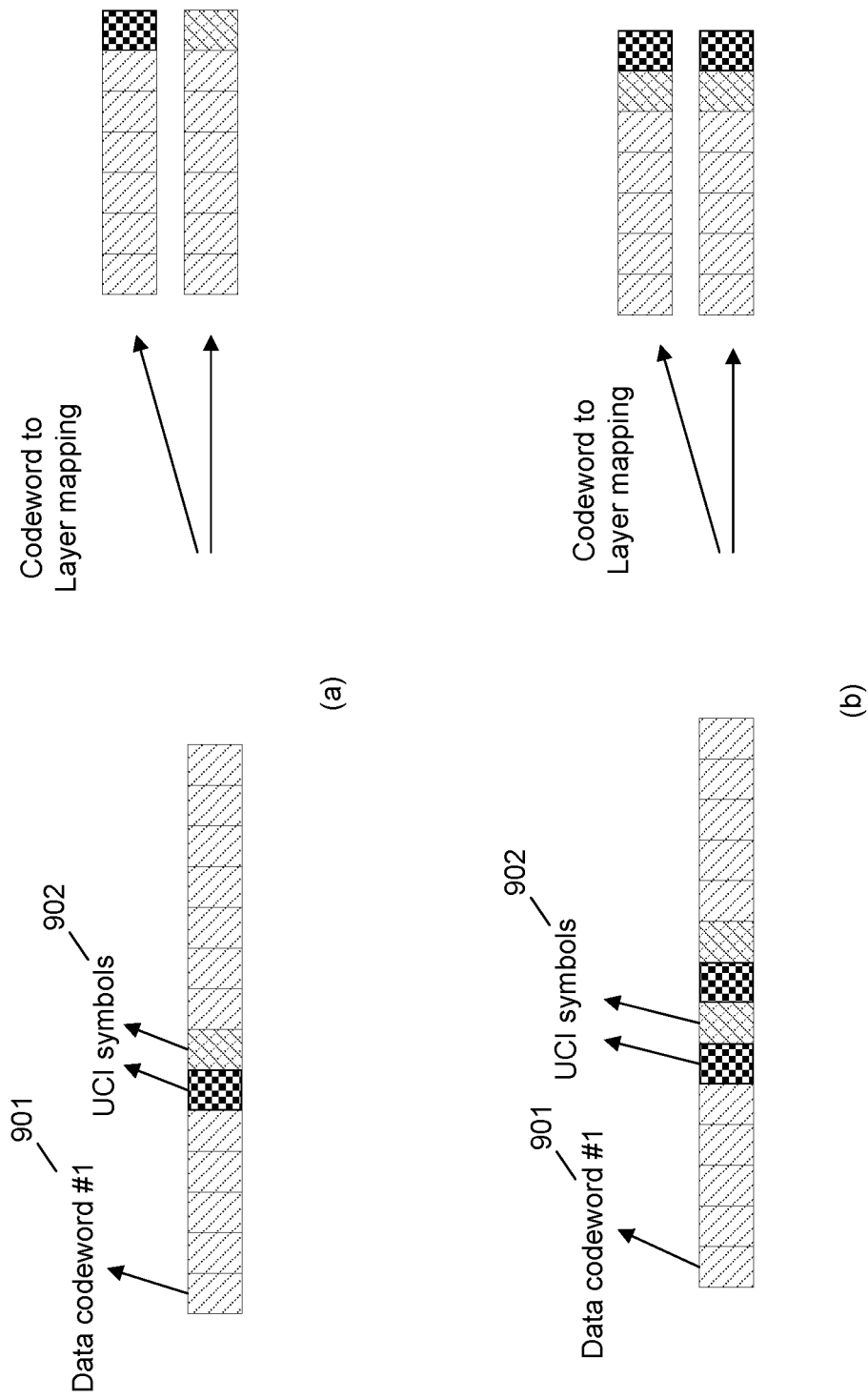
FIG. 9 is a diagram illustrating codeword to layer mapping with and without UCI repetition according to embodiments.

FIG. 9 is a diagram illustrating codeword to layer mapping with and without UCI repetition according to embodiments.

Referring to FIG. 9, case (a) illustrates codeword to layer mapping without repetition of the UCI over two spatial layers, and case (b) illustrates codeword to layer mapping with repetition of the UCI over two spatial layers. For example, in case (a), UCI symbols 902 are mapped to respective spatial layers of the two spatial layers, without repetition; and in case (b), UCI symbols 902 are repeated in each of two spatial layers, wherein the data codeword #1 symbols 901 are mapped to the two spatial layers.

FIG. 10 is a diagram illustrating layer to subcarriers mapping wherein UCI is mapped to the same subcarriers, according to embodiments.

According to embodiments, spatial layers may be mapped to a set of PUSCH subcarriers for transmission. Referring to FIG. 10, spatial layers may be mapped to subcarriers such that the UCI symbols may be placed on the same subcarriers over the layers on which the UCI symbols are transmitted. For example, UCI symbols 1002 may be placed on the same subcarriers over layers 1 and 2 as shown in layer 1 mapping 1003 and layer 2 mapping 1004.

Figure 11:
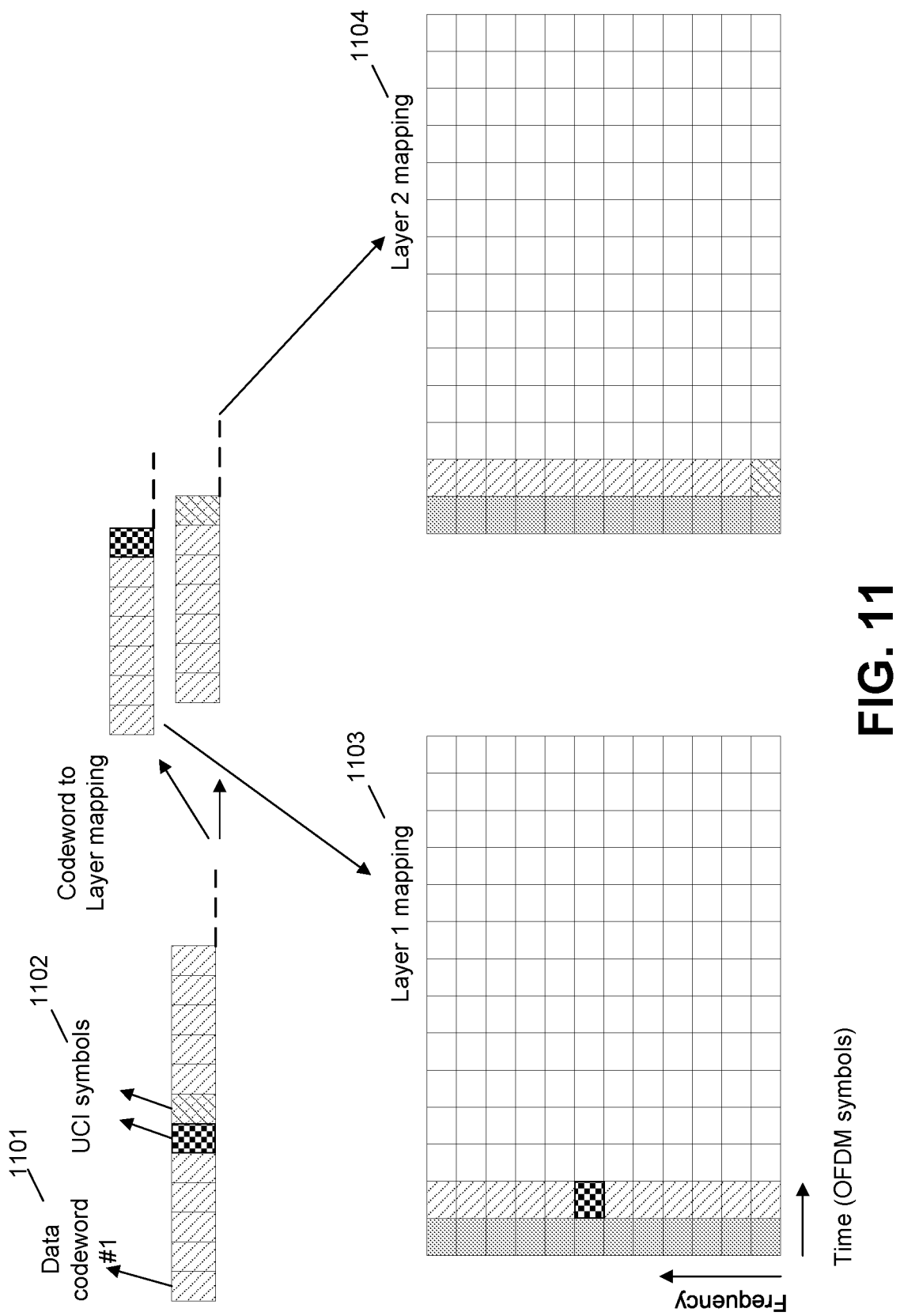
FIG. 11 is a diagram illustrating layer to subcarriers mapping wherein UCI is mapped to different subcarriers, according to embodiments.

FIG. 11 is a diagram illustrating layer to subcarriers mapping wherein UCI is mapped to different subcarriers, according to embodiments.

According to embodiments, referring to FIG. 11, indices of subcarriers used to carry UCI symbols may be different for different sets of layers. For example, UCI symbols 1102 may be placed on different subcarriers over layers 1 and 2 as shown in layer 1 mapping 1103 and layer 2 mapping 1104.

Figure 12:
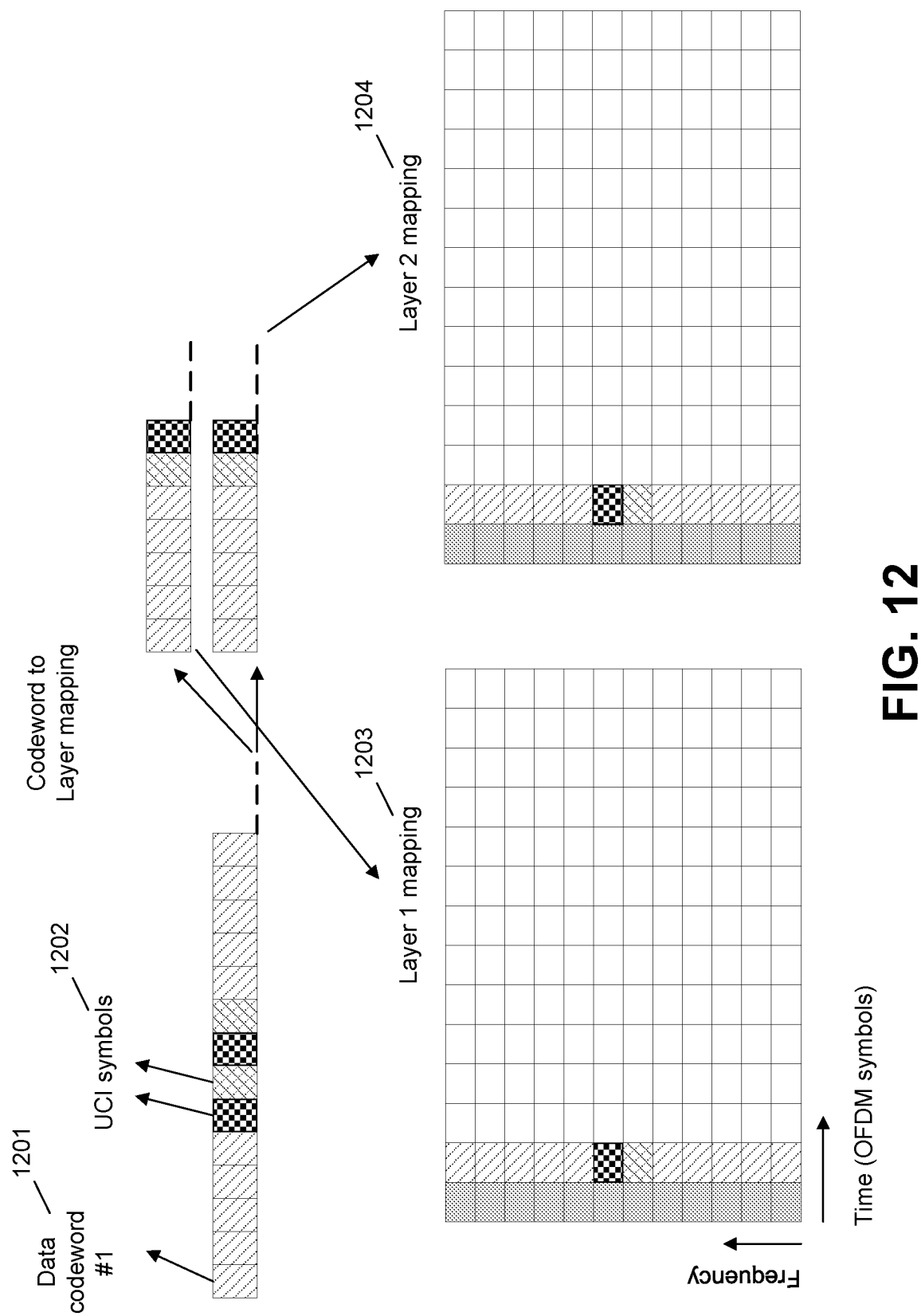
FIG. 12 is a diagram illustrating layer to subcarriers mapping wherein repeated UCI are mapped to the same subcarriers, according to embodiments.

FIG. 12 is a diagram illustrating layer to subcarriers mapping wherein repeated UCI are mapped to same subcarriers, according to embodiments.

According to embodiments, UCI symbols transmitted on different layers may be associated with all or a subset of the UCI. For example, referring to FIG. 12 the UCI symbols 1202 transmitted on different layers, as shown in layer 1 mapping 1203 and layer 2 mapping 1204 may be the same for all or a subset of UCI.

According to embodiments, a spatial layer (e.g., each layer) may be precoded. For example, a signal and/or information associated with a layer (e.g., each layer) may be precoded before being mapped to transmit antennas. According to embodiments, in a case where a symbol is mapped to subcarrier k in layer 1, it may be referred to (e.g., may be given) as z1, while symbols mapped to the same subcarrier in layer 2 may be referred to (e.g., may be given) as z2. In such a case, the signal mapped to the transmit antenna ports on that subcarrier may be generated as:

$$x = G\begin{bmatrix} z1 \\ z2 \end{bmatrix} = g_1 z1 + g_2 z2, \qquad \text{[Equation 2]}$$

wherein G (which may be referred to as a G matrix or matrix G) is a (Ntx×2) precoding matrix with two columns $g_1$ and $g_2$. According to embodiments, G may be a (Ntx×Ntl) matrix, where Ntx is the number of antenna ports and Ntl is the number of layers. For example, G may consist of Ntl (Ntx×1) column vectors.

According to embodiments, a G matrix may be configured by a network (e.g., a central controller). For example, a G matrix may be signaled by a base station to a WTRU (e.g., to a transmitter of the WTRU). According to embodiments, a G matrix may be determined by a transmitting node (e.g., a WTRU). According to embodiments, the same G matrix may be used to precode symbols associated with any number of subcarriers and/or subbands. For example, the same G matrix may be used to precode symbols over any number of subcarriers and/or subbands, such as, over one resource block of 12 subcarriers. According to embodiments, different precoding matrices may be used to precode data over different subbands. According to embodiments, a G matrix may be used to precode PUSCH data according to an absence of UCI. For example, a same G matrix may be used (e.g., over a subband and/or over any number of subcarriers) to precode both data and UCI symbols.

According to embodiments, a subcarrier k, over multiple layers, may be loaded with a same UCI symbol v, and a signal mapped to the antenna ports may be written as:

$$\begin{aligned} x &= G\begin{bmatrix} v \\ \vdots \\ v \end{bmatrix} \\ &= g_1 v + \cdots + g_{Ntl} v \\ &= (g_1 + \cdots + g_{Ntl})v. \end{aligned} \qquad \text{[Equation 3]}$$

In the case of Equation 3, the effective precoding vector $(g_1 + \ldots + g_{Ntl})$ may be a sub-optimal precoding vector for the transmission of v and may result in performance degradation of the UCI reception.

According to embodiments, a precoding operation may be modified, for example, to improve (e.g., the performance of) the UCI transmission. According to embodiments, the precoding operation may be modified as:

$$\begin{aligned} x &= GA(k)\begin{bmatrix} v \\ \vdots \\ v \end{bmatrix} \\ &= G\begin{bmatrix} a_1(k) & \cdots & 0 \\ \vdots & \ddots & \vdots \\ 0 & \cdots & a_{Ntl}(k) \end{bmatrix}\begin{bmatrix} v \\ \vdots \\ v \end{bmatrix} \\ &= g_1 a_1(k)v + \cdots + g_{Ntl} a_{Ntl}(k)v, \end{aligned} \qquad \text{[Equation 4]}$$

wherein A is a diagonal matrix whose diagonal elements may be complex valued.

According to embodiments, a matrix A(k) may be associated with (e.g., selected, determined, and/or indicated from) a codebook. For example, in a case of a two layer transmission of a PUSCH, wherein the UCI symbol is the same for all layers, A(k) may be selected from a codebook:

$$A(k) \in \left\{ \begin{bmatrix} 1+j & 0 \\ 0 & 1-j \end{bmatrix}; \begin{bmatrix} -1+j & 0 \\ 0 & -1-j \end{bmatrix}; \begin{bmatrix} 1 & 0 \\ 0 & 1+j \end{bmatrix}; \begin{bmatrix} 1 & 0 \\ 0 & 1-j \end{bmatrix} \right\}.$$

However, the present disclosure is not limited to the above codebook, and a different codebook may be used.

According to embodiments, the precoding operation may be modified as:

$$x = GA(k)v \quad \text{[Equation 5]}$$
$$= G\begin{bmatrix} a_1(k) \\ \vdots \\ a_{Ntl}(k) \end{bmatrix} v$$
$$= g_1 a_1(k)v + \cdots + g_{Ntl} a_{Ntl}(k)v,$$

wherein A is a vector whose diagonal elements may be complex values and the vector A may be referred to as a precoding vector for virtual antennas. According to embodiments, A(k) (e.g., the vector A) may be selected, determined, or indicated according to a codebook. For example, in a case of a two layer transmission of a PUSCH, wherein the UCI symbol is the same for all layers, A(k) may be selected from a codebook:

$$A(k) \in \left\{ \begin{bmatrix} 1 \\ 1 \end{bmatrix}; \begin{bmatrix} 1 \\ -1 \end{bmatrix}; \begin{bmatrix} 1 \\ j \end{bmatrix}; \begin{bmatrix} 1 \\ -j \end{bmatrix}; \begin{bmatrix} 1 \\ 0 \end{bmatrix}; \begin{bmatrix} 0 \\ 1 \end{bmatrix} \right\} \text{ or }$$
$$\left\{ \begin{bmatrix} 1 \\ 1 \end{bmatrix}; \begin{bmatrix} 1 \\ -1 \end{bmatrix}; \begin{bmatrix} 1 \\ j \end{bmatrix}; \begin{bmatrix} 1 \\ -j \end{bmatrix} \right\}.$$

However, the present disclosure is not limited to the above codebook, and a different codebook may be used.

According to embodiments, A(k) may be known at any of a receiver or a transmitter (e.g., a receiver node, a transmitter node, a base station, a WTRU). According to embodiments, A(k) may be determined by a receiver node (e.g. the base station) and signaled to a transmitter. According to embodiments, A(k) may be determined by a transmitting node and signaled to a receiving node (e.g., the WTRU). According to embodiments, G may be signaled to the receiver by having the transmitter precode data demodulation reference signals with the same G. According to embodiments, in a case where some or all of the UCI symbols are transmitted on a subband, such as a set of consecutive subcarriers (e.g., a subband over which G and A(k) do not change), reference signals transmitted on that subband may be precoded with the composite matrix GA(k). According to embodiments, A(k) may be determined or obtained as a function of G. According to embodiments, A(k) may be determined according to any of a resource index, subcarrier index, or symbol index.

According to embodiments, A(k) may be cycled according to a pattern. For example, A(k) may be cycled through the matrices/vectors in the codebook according to a predetermined pattern. According to embodiments, the cycling may be performed according to any of: a subcarrier, a resource element, a subband, an OFDM symbol, a slot. For example, in a case of a codebook having 4 matrices, a first subcarrier with UCI may be precoded with a first precoded matrix of the codebook, a second subcarrier with UCI may be precoded with a second matrix of the codebook, a third subcarrier with UCI may be precoded with a third precoded matrix of the codebook, and a fourth subcarrier with UCI may be precoded with a fourth precoded matrix of the codebook. According to embodiments, in such a case, a next subcarrier with UCI may be precoded with the first matrix from the codebook, etc.

According to embodiments, a column (e.g., one column) of the G matrix may be used to precode a v symbol on all layers, as shown in Equation 6:

$$x = H \begin{bmatrix} v \\ \vdots \\ v \end{bmatrix} \quad \text{[Equation 6]}$$
$$= h_1 v + \cdots + h_{Ntl} v$$
$$= (h_1 + \cdots + h_{Ntl})v,$$

wherein $h_1 = \ldots = h_{Ntl} = g_i$ (i=1, ..., Ntl). According to embodiments, a precoding method according to Equation 6 may be considered as equivalent to transmitting v on one layer only, for example, potentially with power boosting. According to embodiments, a precoding vector (e.g., a column of the G matrix) may be any of: signaled to a receiver, determined by a receiver, determined by a receiving node, signaled to a transmitter, determined by a transmitter, determined by a transmitting node, or configured by a central controller. According to embodiments, a precoding vector may be determined according to a rule. For example, there may be a rule such that the n'th column of the G matrix is always used for precoding the UCI symbol.

Figure 13:
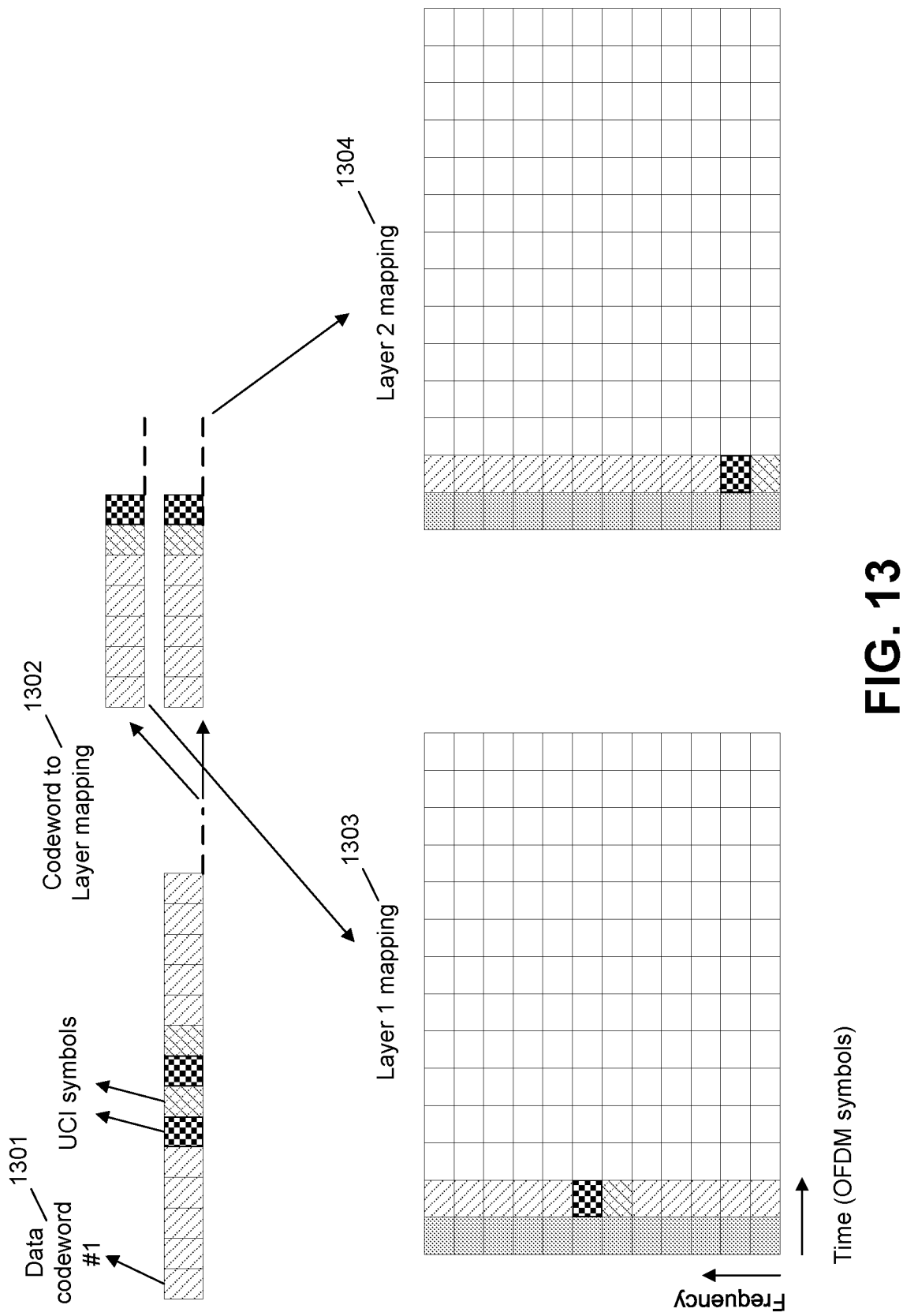
FIG. 13 is a diagram illustrating layer to subcarrier mapping wherein repeated UCI is mapped to different subcarriers, according to embodiments.

FIG. 13 is a diagram illustrating layer to subcarrier mapping wherein repeated UCI is mapped to different subcarriers, according to embodiments.

According to embodiments, any number of the same UCI symbol may be mapped to different subcarriers, as shown in FIG. 13. For example, UCI symbols 1302 may be mapped to different subcarriers of layers 1 and 2, as shown in layer 1 mapping 1303 and layer 2 mapping 1304. According to embodiments, a precoding may be performed according to:

$$x = G \begin{bmatrix} z \\ v \end{bmatrix} = g_1 z + g_2 v, \quad \text{[Equation 7]}$$

wherein z may be a data symbol, and v may be the UCI symbol.

According to embodiments, in a case where a UCI symbol is not repeated on the same subcarrier, a G matrix may be used as a precoding matrix, for example, without modification. According to embodiments, a set of subcarriers carrying the UCI symbol may be different for all layers, or in other words, each layer may be associated with a different set of subcarriers carrying the UCI symbol. For example, in a case of four layers, one UCI symbol may be transmitted on subcarriers 12, 24, 36, 48. According to embodiments, it may be possible to use the same subcarrier for a subset of the layers. For example, in the case of four layers, one UCI symbol may be transmitted on subcarriers 12, 24, 36, 48.

According to embodiments, UCI symbols belonging to a UCI codeword (e.g., encoded and modulated ACK/NACK bits, encoded and modulated RI bits, jointly encoded and modulated ACK/NACK and RI bits) may be transmitted in a PUSCH by puncturing, for example, by replacing symbols associated with (e.g., belonging to) a data codeword. However, the present disclosure is not limited thereto, and features, operations, and methods presented above may be applied to a case of puncturing a PUSCH for UCI transmission.

UCI Transmission in PUSCH for DFT-s-OFDM Waveform

Figure 14:
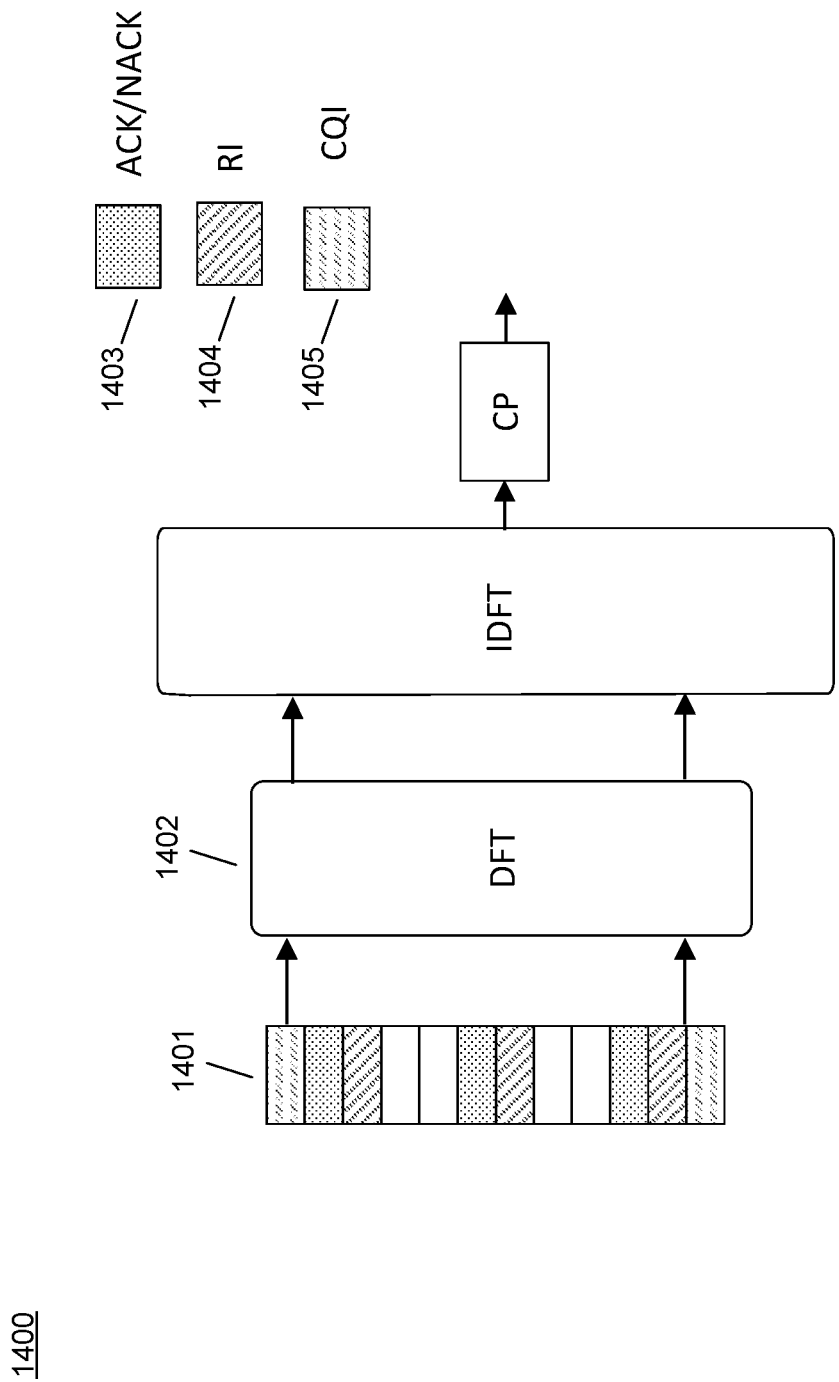
FIG. 14 is a diagram illustrating a DFT-s-OFDM waveform generator according to embodiments.
Figure 15:
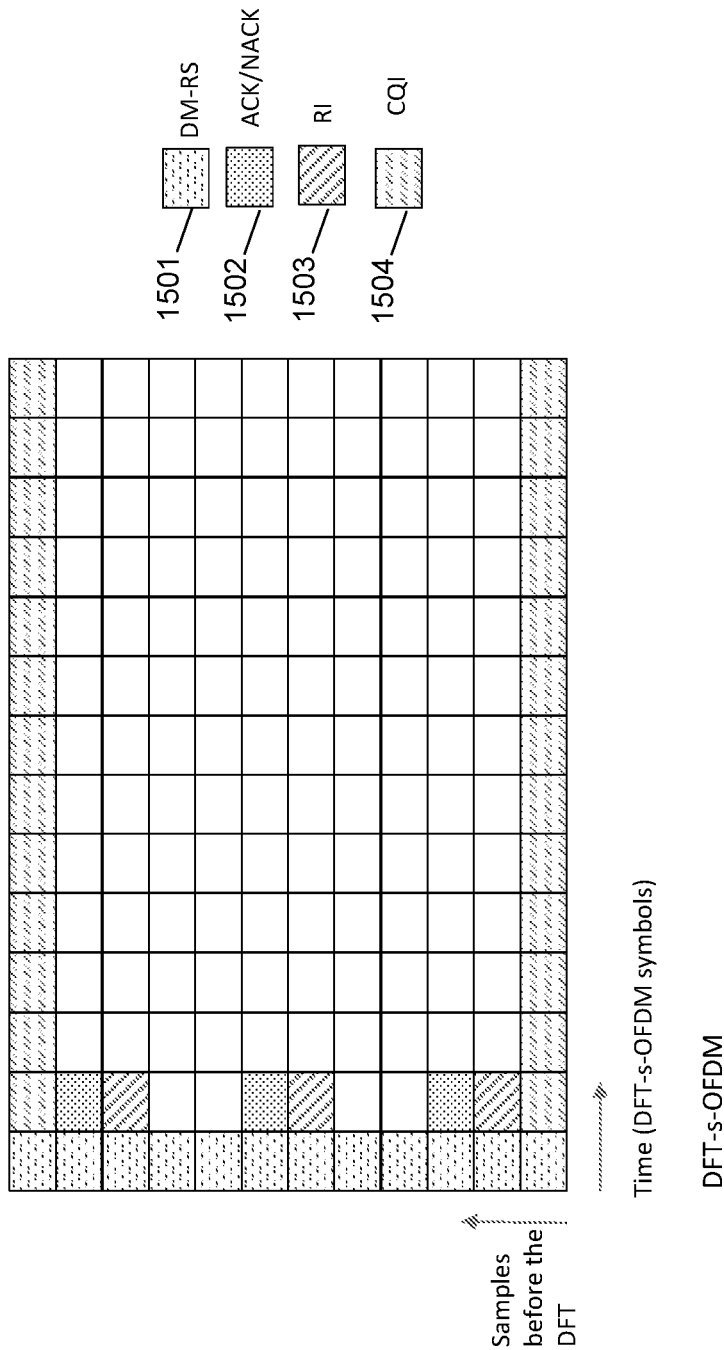
FIG. 15 is a diagram illustrating a DFT-s-OFDM waveform for UCI transmission in a PUSCH.
Figure 16:
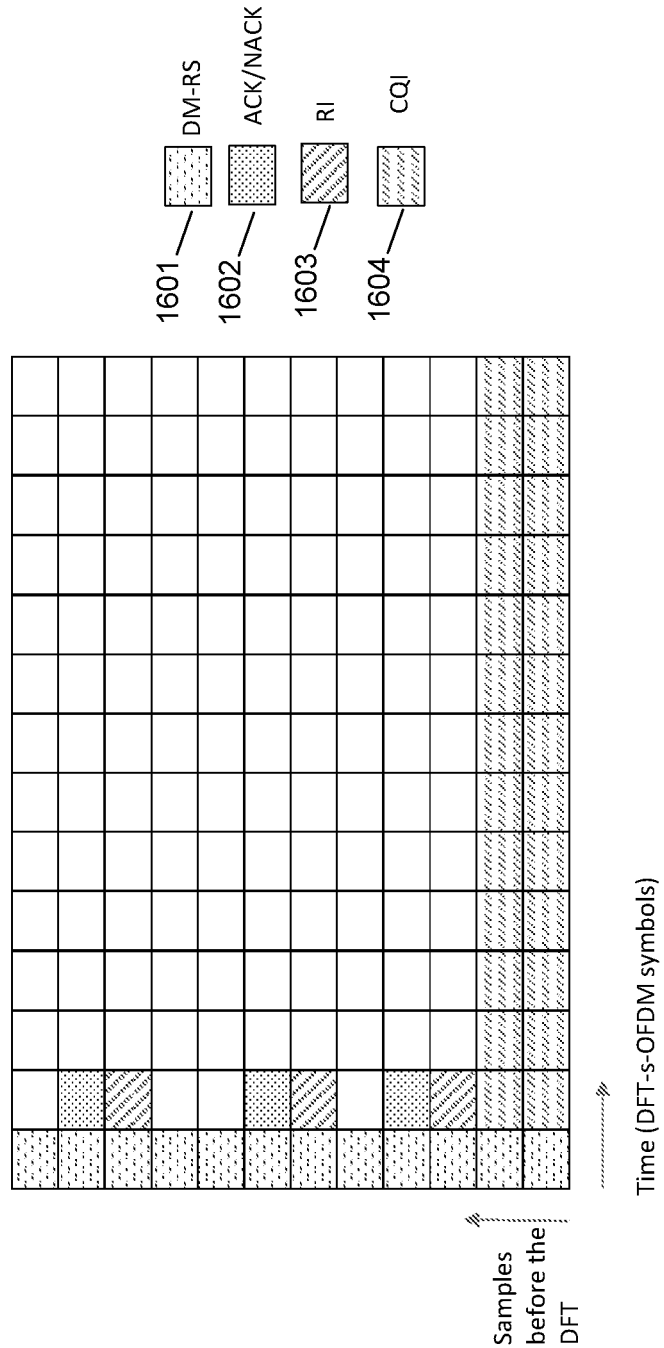
FIG. 16 is a diagram illustrating another DFT-s-OFDM waveform for UCI transmission in a PUSCH.
Figure 17:
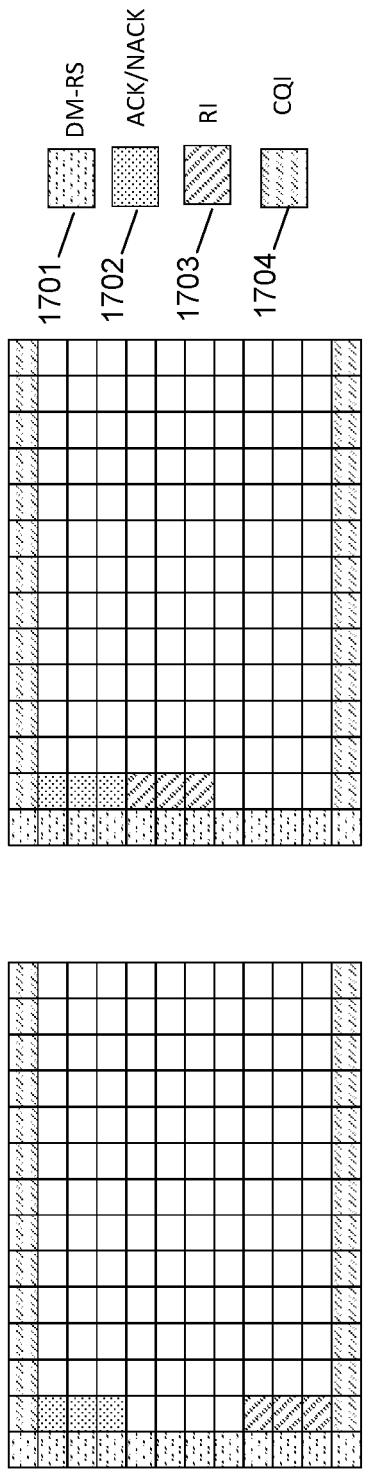
FIG. 17 is a diagram illustrating another DFT-s-OFDM waveform for UCI transmission in a PUSCH.

FIG. 14 is a diagram illustrating a DFT-s-OFDM waveform generator according to embodiments; FIG. 15 is a diagram illustrating a DFT-s-OFDM waveform for UCI transmission in a PUSCH; FIG. 16 is another diagram illustrating a DFT-s-OFDM waveform for UCI transmission in a PUSCH; and FIG. 17 is a diagram illustrating another DFT-s-OFDM waveform for UCI transmission in a PUSCH.

According to embodiments, in a case of DFT-s-OFDM, placement of the UCI symbols (e.g., puncturing) may be performed before the DFT operation. Referring to FIG. 14, placement of the UCI symbols may be performed by block 1401, which is before the DFT block 1402 of the DFT-s-OFDM transmitter 1400. For example, PUSCH and UCI, such as ACK/NACK 1403, RI 1404, and CQI 1405, symbols may be multiplexed before the DFT spreading (e.g., in the time domain). In the following techniques, the DFT inputs may be referred to as time samples or samples. For example, in a case where the DFT size is 12 (e.g., the DFT receives 12 inputs), there are 12 time samples.

According to embodiments, ACK/NACK symbols may be adjacent to the front-loaded DM-RS symbol, e.g., the ACK/NACK symbols may be placed at (e.g., carried by) the DFT-s-OFDM symbol(s) adjacent to the front-loaded DM-RS symbol. According to embodiments, the number of DFT-s-OFDM symbols carrying the ACK/NACK symbols may depend on the number of ACK/NACK symbols and may be configured by the eNB, gNB, and/or other AP. According to embodiments, the number of DFT-s-OFDM symbols may be implicitly determined by the UE/WTRU based on any of the PUCCH format, and/or the number of ACK/NACK symbols, etc. For example, the sample index k of DFT-s-OFDM symbols m+1, m+2, ... m+K, may be used to carry the ACK/NACK symbols. In such a case, DFT-s-OFDM symbol m+1 may be the DFT-s-OFDM symbol adjacent to the front-loaded DM-RS, and K may be a parameter, e.g., the PUCCH format.

According to embodiments, the RI symbols may be placed on the DFT-s-OFDM symbol(s) adjacent to the DM-RS symbol. According to embodiments, the number of DFT-s-OFDM symbols that carry the RI may depend on the number of RI symbols and may be configured by the eNB, gNB, and/or other AP. According to embodiments, the number of DFT-s-OFDM symbols that carry RI may be implicitly determined by the UE/WTRU based on any of the PUCCH format, and/or the number of RI symbols, etc. For example, the sample index I of DFT-s-OFDM symbols m+1, m+2, ... m+L may be used to carry the RI symbols. In such a case, the DFT-s-OFDM symbol m+1 may be the DFT-s-OFDM symbol adjacent to the front-loaded DM-RS, and L may be a parameter. As another example, in a case where a DFT size is 24, there may be 24 samples (which may be referred to or referenced according to associated/respective sample indices, such as sample indices: 1 to 24). In such a case, any number of the 24 inputs, as indicated by respective sample indices, may be replaced with control signaling, for example, ACK/NACK signaling, a RI, CQI, etc.

According to embodiments, other types of UCI, such as CQI, may be placed on a specified set of time samples over a number of DFT-s-OFDM symbols. For example, a set of samples may be on both edges or on one of the edges. Referring to FIG. 15, a frame structure is shown, wherein the ACK/NACK 1502 and RI 1502 symbols are transmitted on the DFT-s-OFDM symbol adjacent to the DM-RS 1501 and the CQI 1504 symbols are transmitted on several DFT-s-OFDM symbols following the DM-RS 1501. According to embodiments, the CQI 1504 symbols in the frame structure of FIG. 15 are placed on the two edges of the DFT input. Referring to FIG. 16, the CQI 1604 symbols may be placed on one edge of the DFT input. According to embodiments, the number of DFT-OFDM symbols may span a part of or the whole TTI.

According to embodiments, the DM-RS may be front-loaded (e.g., the DM-RS may be transmitted before commencing the transmission of user data), and there may be any number of transmitted DM-RS symbols. In the case of transmitting multiple DM-RS symbols, the UCI data transmission may commence after the last DM-RS symbol of the front loaded DM-RS transmitted. According to embodiments, the ACK/NACK 1702 and RI 1703 symbols may be distributed over the inputs of the DFT as shown in FIG. 17, or they may be transmitted over a consecutive set of DFT inputs as shown in FIG. 17. According to embodiments, the set of inputs used for ACK/NACK and RI may be adjacent or non-adjacent/distributed.

ACK/NACK symbols may be placed into the PUSCH according to any of the following methods. According to embodiments, ACK/NACK symbols may puncture the PUSCH, (e.g., the data modulation symbols that are to be transmitted in PUSCH (e.g. 16 QAM symbols) may be replaced by the ACK/NACK symbols). According to embodiments, the PUSCH may be rate-matched around the ACK/NACK symbols. In this case of rate-matching, the PUSCH resources to be loaded with ACK/NACK symbols may not be counted towards the number of available resources for PUSCH transmission.

According to embodiments, it may be determined whether: (a) the ACK/NACK symbols may puncture the PUSCH and/or (b) the PUSCH may be rate-matched around the ACK/NACK symbols. According to embodiments, such determination may depend on any of the following: (i) a number of DFT-s-OFDM symbols available for PUSCH within a transmission time interval; (ii) a number of total PUSCH resources (e.g., a number of DFT-s-OFDM symbols available for PUSCH within a transmission time interval multiplied by the number of allocated subcarriers, wherein, a number of subcarriers may be equal to a number of DFT input pins); and/or (iii) a number of ACK/NACK symbols to be transmitted in the PUSCH.

According to embodiments, with respect to at least the discussion above, any of the following rules may apply: (1) n may be the number of DFT-s-OFDM symbols available for PUSCH, k may be the number of allocated subcarriers, and m may be the number of ACK/NACK symbols; (2) the ACK/NACK symbols may puncture the PUSCH, if m<M, and the PUSCH may be rate-matched around the ACK/NACK symbols, if m≥M, the parameter M may be configured and/or signaled by the eNB, gNB, and/or other AP and/or it may be determined by the PUCCH format; (3) if n<N, the PUSCH may be rate-matched around the ACK/NACK symbols, the parameter N may be configured by the eNB, gNB, and/or other AP, and/or it may be determined by the PUCCH format, if n≥N, the ACK/NACK symbols may puncture the PUSCH symbols if m<M, and if m≥M, the PUSCH may be rate-matched around the ACK/NACK symbols; and/or (4) if nk<L, the PUSCH may be rate-matched around the ACK/NACK symbols, the parameter L may be configured and/or signaled by the eNB, gNB, and/or other AP, and/or it may be determined by the PUCCH format, if nk≥L, the ACK/NACK symbols may puncture the PUSCH symbols if m<M, and if m≥M, the PUSCH may be rate-matched around the ACK/NACK symbols.

According to embodiments, ACK/NACK symbols may puncture a PUSCH. For example, in a case where a ratio of the number of ACK/NACK symbols to the number of modulation symbols in a code block is below a threshold, ACK/NACK symbols may puncture a PUSCH. According to embodiments, there may be a case where Z number of information bits are encoded to generate bZ coded bits, wherein b may be a rational number. In such a case, the bZ coded bits may be modulated with a modulation scheme, such as QAM modulation, to generate modulation symbols.

According to embodiments, modulation symbols may be transmitted on a set of resources of a PUSCH, for example, allocated resources of the PUSCH that consist of a number of subcarriers over any number of OFDM symbols, and the coding rate may be 1/b. According to embodiments, in a case where some of the modulation symbols are punctured and replaced by ACK/NACK symbols, an effective coding rate may be larger than 1/b. According to embodiments, in a case where an increase in the coding rate when puncturing is used is less than a value (for example, $\Delta<\beta$, wherein $\Delta$ is an increase in the effective coding rate and $\beta$ is a threshold value), then ACK/NACK symbols may puncture the PUSCH, otherwise the PUSCH may be rate-matched around the ACK/NACK symbols. According to embodiments, $\Delta$ and $\beta$ may be configured by a central controller. According to embodiments, the PUSCH may be rate-matched around the RI and/or CQI symbols.

Figure 18:
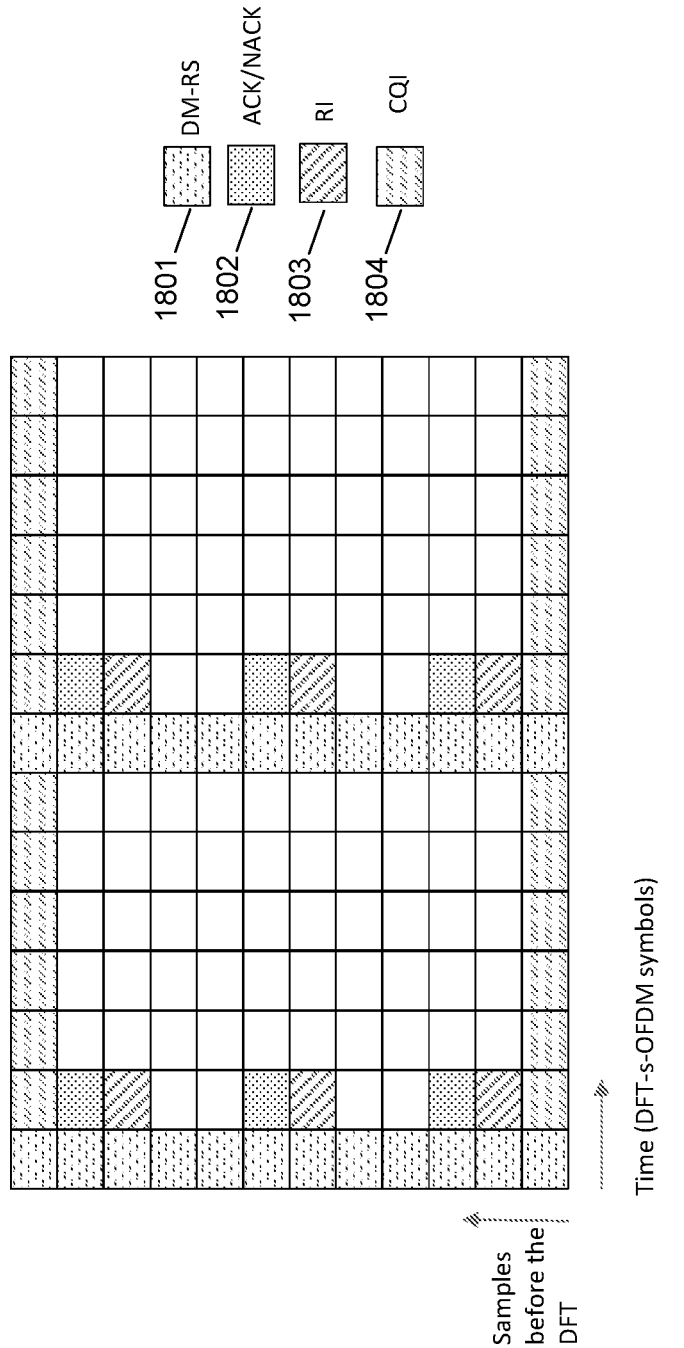
FIG. 18 is a diagram illustrating UCI transmission with additional DM-RS using DFT-s-OFDM according to embodiments.

FIG. 18 is a diagram illustrating UCI transmission with additional DM-RS using DFT-s-OFDM according to embodiments.

According to embodiments, in addition to and/or in lieu of the front-loaded DM-RS, DM-RS may be configured for transmission, for example, to improve channel estimation accuracy when mobility is high. In such a case, any of the ACK/NACK 1802 and/or the RI 1803 symbols may be placed around the DM-RS 1801 symbols that are front-loaded and the additional DM-RS 1801 symbols, as shown in FIG. 18. According to embodiments, the following may apply: (1) ACK/NACK symbols to be transmitted adjacent to the front-loaded DM-RS may be repeated on the DFT-s-OFDM symbols adjacent to the additional DM-RS symbol, and if more than one additional DM-RS is configured, the ACK/NACK symbols may be transmitted on DFT-s-OFDM symbols adjacent to at least one of the additional DM-RS symbols; and/or (2) the ACK/NACK symbols may be divided into a set of groups and each group may be transmitted on the DFT-s-OFDM symbols adjacent to one of the DM-RS symbols.

According to embodiments, reference symbols (RSs), for example a PT-RS used to estimate and track the phase noise, may be enabled (e.g., turned on) and transmitted on certain DFT inputs of specific DFT-s-OFDM symbols Although the following techniques are presented in the context of PT-RS, the present disclosure is not limited thereto, and the techniques are applicable to other types of RSs. According to embodiments, when PT-RS transmission is enabled (e.g., turned on), any of the following methods may apply: (1) the UCI symbols may be punctured by the PT-RS; (2) the UCI symbols may be punctured by the PT-RS, if the UCI is not an ACK/NACK and/or a RI; (3) the PT-RS is punctured by the UCI, if the UCI is an ACK/NACK and/or a RI; (4) the PT-RS is punctured by the UCI; and/or (5) the time sample indices of either the UCI and/or the PT-RS are shifted based on an established rule to prevent collision of UCI and PT-RS. For example, in a case where time samples n, n+1 are to carry the UCI, and the PT-RS is enable for time sample n, UCI may be transmitted on time samples n+1, n+2; or PT-RS may be transmitted on time sample n−1.

According to embodiments, the disclosed techniques may similarly be applicable to transmission schemes where a TTI may be shared for downlink and uplink transmission, e.g., a mixed TTI. In such a case, the schemes disclosed herein may apply to an uplink transmission part of such mixed TTIs.

DM-RS Density Adaptation Based on UCI Transmission in PUSCH

According to embodiments, the DM-RS density for a PUSCH transmission may be determined according to any of the presence of UCI on the PUSCH (e.g., the UCI being transmitted via a PUCSH) or UCI types multiplexed in, on, and/or with the PUSCH. According to embodiments, the DM-RS density may be associated with any of (1) a DM-RS frequency density (e.g., the number of REs used for DM-RS in an OFDM or DFT-s-OFDM symbol used for DM-RS transmission) and/or (2) a DM-RS time density (e.g., the number OFDM and/or DFT-s-OFDM symbols used for DM-RS transmission) within a scheduled bandwidth for PUSCH transmission and/or a physical RB (PRB).

According to embodiments, a DM-RS pattern for a PUSCH transmission may be determined based on the presence of UCI on the PUSCH and/or UCI types multiplexed in the PUSCH. According to embodiments, the DM-RS pattern may be time and frequency locations of DM-RSs within a PRB. According to embodiments, one or more DM-RS patterns may have the same DM-RS density or different DM-RS densities. As referred to herein, the terms DM-RS density and DM-RS pattern may be used interchangeably, but are still consistent with their respective descriptions provided herein.

According to embodiments, a first DM-RS density may be used in a case where no UCI is multiplexed in a PUSCH transmission and a second DM-RS density may be used in a case where UCI is multiplexed in the PUSCH transmission. For example, the first DM-RS density may be based on a front-loaded DM-RS (e.g., the first one or two OFDM and/or DFT-s-OFDM symbols used for DM-RS) and the second DM-RS density may be based on the front-loaded DM-RS with an additional DM-RS (e.g., additional OFDM and/or DFT-s-OFDM symbol in a later symbol within a PUSCH transmission may be used for DM-RS).

According to embodiments, a UE/WTRU may determine the transmission of additional DM-RS (or a second DM-RS density) based on the presence of UCI (or multiplexing of UCI) in the PUSCH transmission. In such a case, the front-loaded DM-RS may be transmitted irrespective of the UCI presence/absence and the additional DM-RS transmission may be determined based on the UCI presence/absence in a PUSCH transmission. In such a case, the additional DM-RS may be transmitted based on the presence of certain type of UCI. For example, the additional DM-RS may not be transmitted (e.g., the first DM-RS density is used) if a first UCI type is multiplexed in a PUSCH transmission, and the additional DM-RS may be transmitted (e.g., the second DM-RS density is used) if a second UCI type is multiplexed. According to embodiments, the first UCI type may include any of wideband/subband CQI and/or PMI, and the second UCI type may include any of RI, HARQ-ACK, and/or CSI-RS resource index (CRI).

According to embodiments, the use of multiple DM-RS densities based on the presence (e.g. multiplexing) of UCI may be enabled/disabled (e.g., turned on/off) by a configuration (e.g., according to configuration information). For example, in a case where a gNB (e.g., eNB, HNB, etc.) is configured to use multiple DM-RS densities, then a UE/WTRU may determine a DM-RS density within the configured DM-RS densities based on the presence (or multiplexing) of UCI on a PUSCH transmission. Otherwise, according to embodiments, a UE/WTRU may use a DM-RS density, which may be determined irrespective of the presence/absence of UCI in a PUSCH transmission.

According to embodiments, the configuration to turn on/off (e.g., configuration information enabling/disabling) the use of multiple DM-RS densities may include and/or be included in any of following: (1) a higher layer signaling; (2) an implicit determination based on any system parameters (e.g., subcarrier spacing, a TTI length, a slot number, a radio frame number, a frequency band, and/or a system bandwidth); (3) an implicit determination based on a service type (e.g., an eMBB, a URLLC, and/or a mMTC); and/or (4) an implicit determination based on at least one of UE/WTRU-specific parameters, such as a UE/WTRU-ID, a UE/WTRU category, scheduling parameters (e.g., MCS, number of layers, and/or scheduled bandwidth), and/or UE/WTRU capability, among others.

According to embodiments, the presence (or multiplexing) of UCI may be determined according to a number of REs used (e.g., required) for the UCI transmission within the scheduled PUSCH resource. According to embodiments, in a case where the number of REs used for the UCI transmission is smaller than a threshold, a UE/WTRU may consider/determine that UCI is not multiplexed for a PUSCH transmission, for example, to determine the DM-RS density. In a case where the number of REs used for UCI transmission is equal to or larger than a threshold, the UE/WTRU may consider/determine that UCI is multiplexed for a PUSCH transmission, for example, to determine DM-RS density.

According to embodiments, the DM-RS density may be determined based on the number of REs used (e.g., required) for a UCI transmission within a scheduled PUSCH resource. For example, in a case where the number of REs used for a UCI transmission is smaller than a threshold, a first DM-RS density may be used, and in a case where the number of REs used for a UCI transmission is larger than a threshold, a second DM-RS density may be used. According to embodiments, the threshold may be any of a predefined threshold, a threshold determined as a function of the scheduled resources for a PUSCH transmission (e.g., number of available REs for a PUSCH transmission), and/or any other numerical value.

Figure 19:
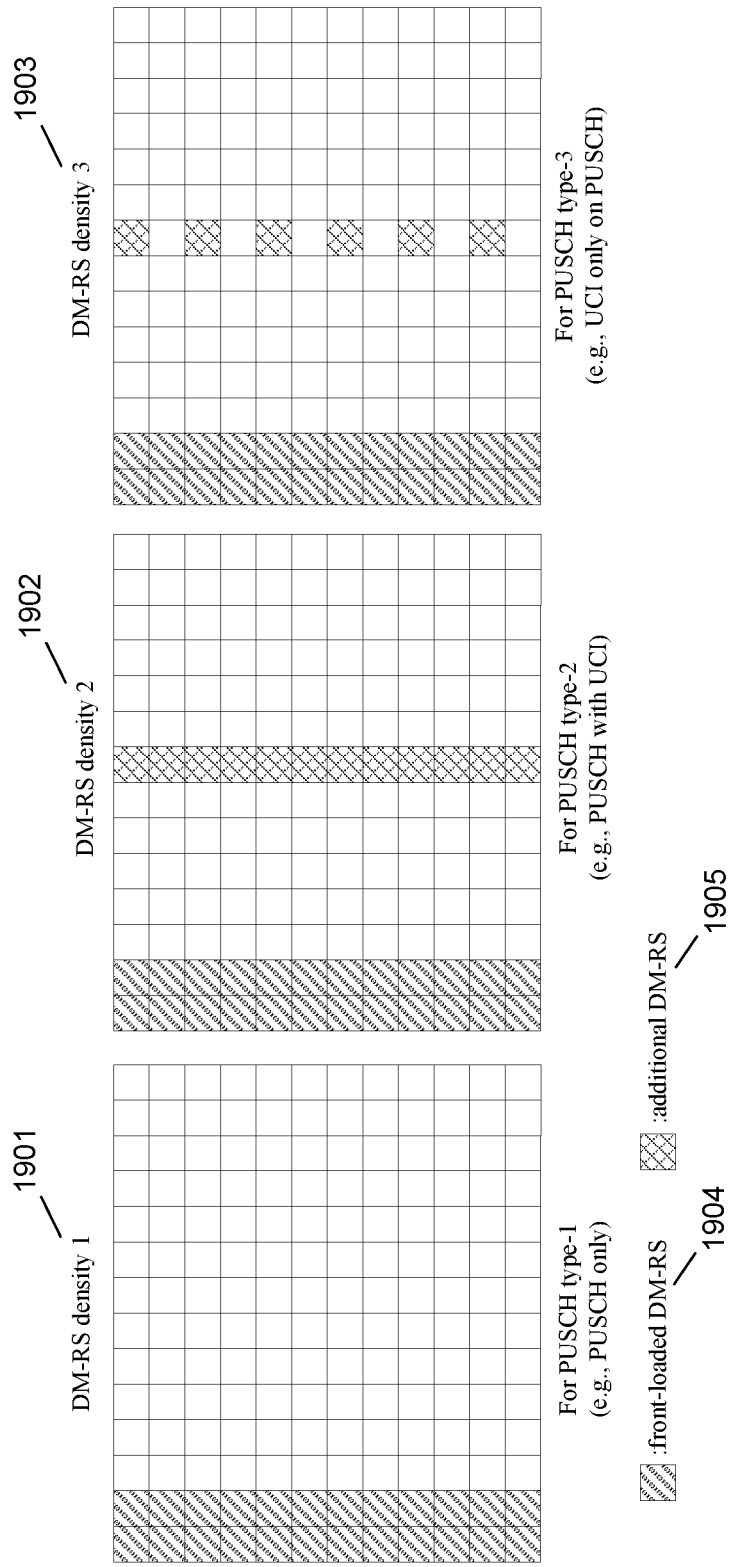
FIG. 19 is a diagram illustrating DM-RS density and pattern based on PUSCH type and UCI type according to embodiments.

FIG. 19 is a diagram illustrating DM-RS density and pattern based on PUSCH type and UCI type according to embodiments.

According to embodiments, one or more DM-RS densities may be used and the DM-RS density for a PUSCH transmission may be determined according to any of the presence of UCI in the PUSCH and/or a UCI type. Referring to FIG. 19, for example: (1) a first DM-RS density 1901 may be used if no UCI is multiplexed for a PUSCH transmission; (2) a second DM-RS density 1902 may be used if UCI, including front-loaded DM-RS 1904 and additional DM-RS 1905, is multiplexed in the PUSCH and the UCI is the first UCI type; and/or (3) a third DM-RS density may be used if UCI is multiplexed in the PUSCH and the UCI is the second UCI type. According to embodiments, a first UCI type may include any of wideband/subband CQI and/or PMI; a second UCI type may include any of RI and/or CRI; and a third UCI type may include any of HARQ-ACK for a single carrier and/or HARQ-ACK for multiple carriers.

According to embodiments, in a case where multiple UCI types are transmitted at the same time, a UCI type that uses and/or needs (e.g., requires) the highest (or lowest) DM-RS density may be used to determine the DM-RS density for the PUSCH transmission including the multiple UCI types.

Figure 20:
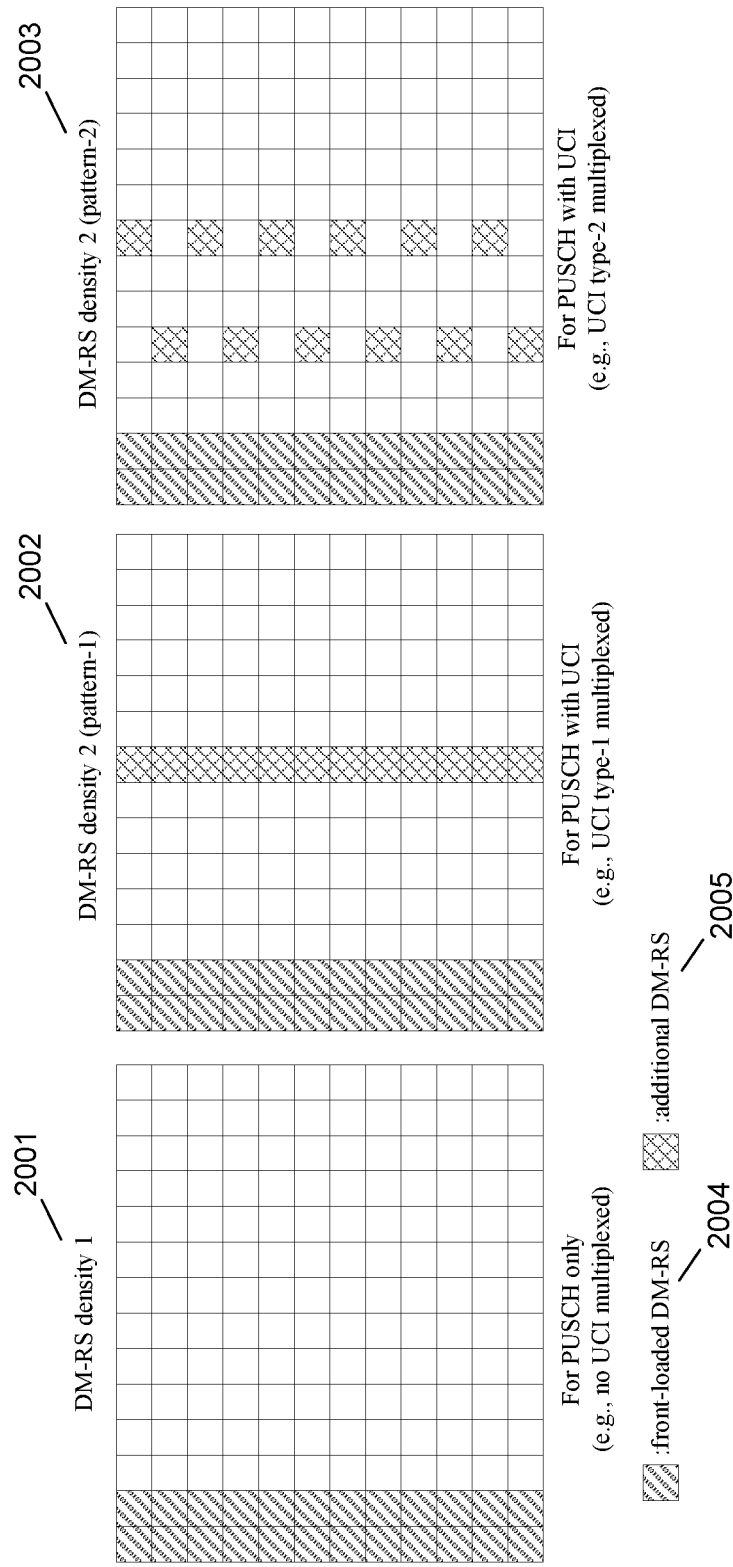
FIG. 20 is a diagram illustrating DM-RS density and pattern based on PUSCH type according to embodiments.

FIG. 20 is a diagram illustrating DM-RS density and pattern based on PUSCH type according to embodiments.

According to embodiments, one or more DM-RS densities may be used and the DM-RS density for a PUSCH transmission may be determined according to a PUSCH type. According to embodiments, the PUSCH type may be any of PUSCH only (e.g., PUSCH type 1), PUSCH with UCI (PUSCH type 2), or UCI only on PUSCH (PUSCH type 3), as shown in FIG. 20. According to embodiments, any number of DM-RS patterns having the same DM-RS density, such as DM-RS patterns 2002, 2003, may be used. For example, a DM-RS pattern 2001 may be used for PUSCH type 1, a DM-RS pattern 2002 may be used for PUSCH type 2 (e.g., the PUSCH with UCI, including front-loaded DM-RS 2004 and additional DM-RS 2005) and another DM-RS pattern 2003 may be used for PUSCH type 3 (UCI only on the PUSCH). According to embodiments, the disclosed techniques may similarly be applicable to transmission schemes where a TTI may be shared for downlink and uplink transmission, e.g., a mixed TTI. In such a case, the schemes disclosed herein may apply to an uplink transmission part of such mixed TTIs.

PRB Bundling Size Adaptation Based on UCI Transmission in PUSCH

According to embodiments, any number of PRBs may be bundled. According to embodiments, a PRB bundling size may be determined based on the presence of UCI on the PUSCH. For example, a first PRB bundling size may be used if no UCI is multiplexed for a PUSCH transmission, and a second PRB bundling size may be used if UCI is multiplexed for a PUSCH transmission.

According to embodiments, a PRB bundling size may be referred to as (e.g., may be considered to be, determined by, indicated by, associated with) a same precoder used for one or more PRBs within a bundled PRB group (PRG). A PRB bundling size may indicate the number of PRBs within a bundled PRB group. According to embodiments, a receiver may use reference signals of any number of PRBs within the bundled PRB group, for example, to improve the channel estimation performance.

According to embodiments, a bundled PRB group may include PRBs in a same slot. According to embodiments, any number of PRBs in a bundled PRB group may be consecutive in a frequency domain. According to embodiments, a bundled PRB group may include PRBs in any number of (e.g., different) slots. According to embodiments, any number of PRBs in a bundled PRB group may be consecutive in a time domain.

According to embodiments, there may be any number of PRB bundling sizes. According to embodiments, a PRB bundling size may be determined based on the presence of UCI on a PUSCH. For example, a WTRU may determine a PRB bundling size according to UCI (e.g., detected and/or decoded control signaling) received on a PUSCH. According to embodiments, a PRB bundling size may include all PRBs from among (e.g., a set of) scheduled PRBs for a PUSCH transmission. In such a case, a same precoder may be used for all scheduled PRBs, which may be referred to as wideband PRB bundling. According to embodiments, a PRB bundling size may include any number of PRBs from among (e.g., a set of) scheduled PRBs for a PUSCH transmission.

According to embodiments, a PRB bundling size may be configured via a higher layer signaling. For example any number of PRB bundling sizes may configured (e.g., determined, set, selected, etc.) via broadcast control signaling. According to embodiments, higher layer signaling may be used to configure a method of determining a PRB bundling size. For example, a PRB bundling size determination according to a presence of UCI on a PUSCH may be enabled (e.g., turned on/off) according to configuration information and/or signaling received from a higher layer. According to embodiments, a configuration (e.g., control signaling, configuration information, and/or information element, etc.) may include or be any of:

(1) a higher layer configuration (e.g., higher layer configuration information);
(2) an implicit configuration (e.g., implicit configuration information) associated with a waveform; for example, dynamic PRB bundling size adaptation may be used in a case where OFDM is used for a PUSCH transmission; for example, wideband PRB bundling may be used in a case where DFT-s-OFDM is used for a PUSCH transmission;
(3) an implicit determination according to system parameter, including any of: (i) subcarrier spacing, (ii) a TTI length, (iii) a slot number, (iv) a radio frame number, (v) a frequency band, (vi) a system bandwidth, and/or (vii) any other system parameter;
(4) an implicit determination according to a service type, including any of: (i) an eMBB, (ii) a URLLC, (iii) a mMTC; and/or (iv) any other service type; and/or
(5) an implicit determination according to a UE/WTRU-specific parameters, including any of: (i) a UE/WTRU-ID, (ii) a UE/WTRU category, (iii) scheduling parameters (e.g., an MCS, a number of layers, a scheduled bandwidth, etc.), (iv) a UE/WTRU capability; and/or (v) any other UE/WTRU-specific parameter.

According to embodiments, any number of PRB bundling sizes may be used and a PRB bundling size (e.g., for a PUSCH transmission) may be determined according to any of the presence of UCI and/or a UCI type. For example, a first PRB bundling size may be used in a case where no UCI is multiplexed for a PUSCH transmission, a second PRB bundling size may be used in a case where UCI is multiplexed and the UCI is a first UCI type; and a third PRB bundling size may be used in a case where UCI is multiplexed and the UCI is a second UCI type, etc. According to embodiments, a UCI types may include and/or be any of: (1) a first UCI type for any of wideband/subband CQI and/or PMI; (2) a second UCI type for any of RI and/or CRI; (3) a third UCI type for any of HARQ-ACK for a single carrier and/or HARQ-ACK for multiple carriers.

According to embodiments, multiple UCI types may be transmitted at a same time. In the case of multiple UCI types, a PRB bundling size for the PUSCH transmission may be determined according to a PRB size of a UCI type (from among the multiple UCI types), for example, a UCI type using or needing (e.g., requiring) a largest or a smallest PRB bundling size. According to embodiments, any number of PRB bundling sizes may be used and a PRB bundling size (e.g., for a PUSCH transmission) may be determined according to a PUSCH type. According to embodiments, a PUSCH type may be any of: (1) a PUSCH type 1 for PUSCH only, (2) a PUSCH type 2 for PUSCH with UCI, and/or (3) a PUSCH type 3 for UCI only on PUSCH.

According to embodiments, the disclosed techniques may similarly be applicable to transmission schemes where a TTI may be shared for downlink and uplink transmission, e.g., a mixed TTI. In such a case, the schemes disclosed herein may apply to an uplink transmission part of such mixed TTIs.

Interleaved Time-Frequency Resource Element Mapping of CQI in PUSCH

According to embodiments, in a case of a CP-OFDM transmission, a resource element mapping may be distributed (e.g., interleaved) across allocated time-frequency resources for a PUSCH transmission. For example, distributed (e.g., interleaved) resource element mapping may be used to achieve time-frequency diversity for CQI. In contrast to the present disclosure, (e.g., legacy) LTE uses frequency first mapping with sequential direct mapping of the CQI payload on the adjacent resource elements. In the case of (e.g., legacy) LTE and Code Block Groups (CBGs), the frequency first mapping (e.g., substantially) impacts performance of certain CBGs for large CQI payloads due to the excessive resource loss for certain CBGs for data transmission. Further, in the case of (e.g., legacy) LTE, time-first sequential mapping of the CQI payload in low speed scenarios may not provide any diversity gain.

According to embodiments, in the case of interleaved time-frequency resource element mapping of CQI in a PUSCH, the CQI information bits may be (e.g., first) channel encoded and/or (e.g., second) rate matched to the available resources for CQI transmission on a PUSCH. According to embodiments, a WTRU may determine an amount of resource elements for CQI transmission in a (e.g., given, certain) slot. According to embodiments, a WTRU may (e.g., dynamically) determine an amount of resource elements for a CQI transmission in a given slot according to a performance target for CQI (e.g., in terms of BLER, and/or PAPR, etc.).

According to embodiments, a WTRU may (e.g., dynamically) determine an amount of resource elements. According to embodiments, an amount of resource elements for a CQI transmission in a given slot may be determined according to a configured DM-RS pattern of a slot. For example, a WTRU may use a lower coding rate (e.g., allocate higher number of resources) for a CQI transmission on a PUSCH in case of lower density of DM-RS, for example, to compensate for loss associated with channel estimation accuracy. According to embodiments, a WTRU may (e.g., dynamically) determine an amount of resource elements for a CQI transmission in a given slot according to a simultaneous transmission of a short or a long PUCCH in a TDM or FDM manner with a PUSCH.

According to embodiments, an amount of resource elements for a CQI transmission in a given slot may be determined according to a waveform used for a PUSCH transmission (e.g., a CP-OFDM and/or a DFT-s-OFDM). According to embodiments, a WTRU may use a lower coding rate (e.g., allocate a higher number of resources) for CQI transmission on a PUSCH in case of CP-OFDM, for example, in a case of limited coverage for CP-OFDM compared to DFT-s-OFDM. According to embodiments, a WTRU may (e.g., dynamically) determine an amount of resource elements for a CQI transmission in a given slot according to an existence of other reference symbols in the slot, such as PT-RS, CSI-RS, interference measurement resource (IMR), etc., and/or an amount of payload for other UCIs (e.g., ACK/NACK, RI, etc.) to be transmitted on the same PUSCH.

According to embodiments, an amount of resource elements for a CQI transmission in a given slot may be determined according to whether RBs allocated for PUSCH transmission are contiguous or non-contiguous. According to embodiments, in a case of non-contiguous allocation, inter-modulation distortion (IMD) may be taken into account. According to embodiments, higher IMD can be addressed by lowering a coding rate (e.g., an effective coding rate) for CQI. According to embodiments, an amount of resource elements for a CQI transmission in a given slot may be determined according to an available power headroom (e.g., according to the Power Headroom Report (PHR)). For example, a WTRU may use a PHR to determine any of (1) how much transmission power is left for power boosting a CQI transmission and/or (2) a power being used by current PUSCH transmission.

According to embodiments, an amount of resource elements for a CQI transmission in a given slot may be determined according to a CBG configuration. For example, in contrast to a case where a CBG consists of multiple code blocks (CBs), in a case where a CBG consists of a single CB, a WTRU may use a different coding rate for CQI. According to embodiments, an amount of resource elements for a CQI transmission in a given slot may be determined according to a PUSCH mode (e.g., for operation, used for operation, etc.), for example, single user with multi-layer MIMO, single user with single-layer MIMO, and Multi-user MIMO.

Figure 21:
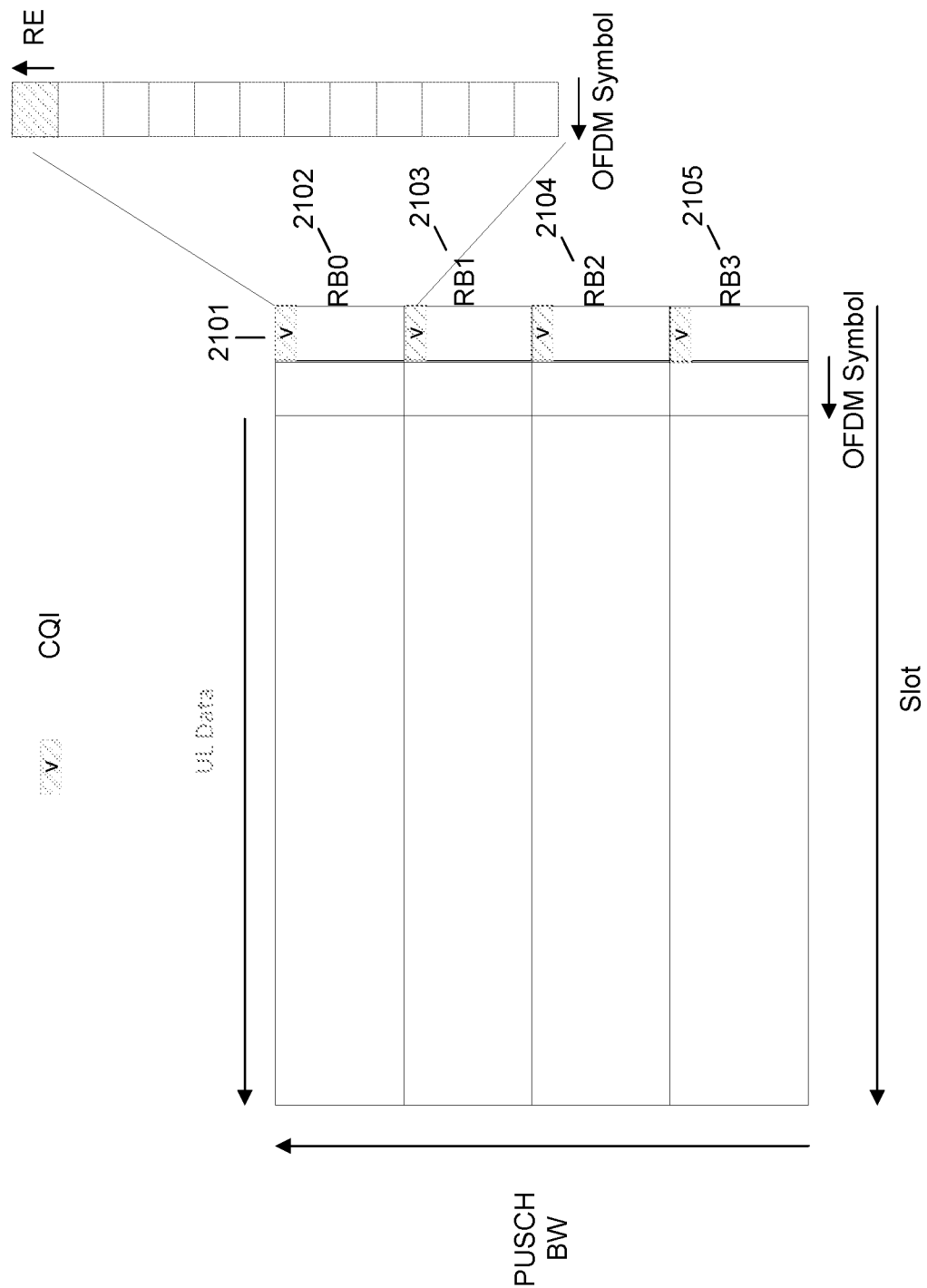
FIG. 21 is a diagram illustrating frequency interleaved resource mapping of CQI on a PUSCH according to embodiments.

FIG. 21 is a diagram illustrating frequency interleaved resource mapping of CQI on a PUSCH according to embodiments.

According to embodiments, a WTRU may use a (e.g., configured, pre-configured, pre-determined, signaled, etc.) pattern for resource element mapping of CQI on a PUSCH. According to embodiments, a pattern may employ (e.g., indicates, uses, references, allocates, configures, selects, etc.) time-frequency resource elements interleaved in any of time and/or frequency domains. Referring to FIG. 21, a scheme (e.g., a pattern, a mapping) consisting of a Resource Block Group (RBG) including at least one RB is illustrated.

According to embodiments, a WTRU may partition a bandwidth (e.g., allocated) for PUSCH transmission according to (e.g., for) any number of RBGs. According to embodiments, RBGs may include any number of RBs, for example, localized or distributed RBs. For example, referring to FIG. 21, a RBG 2101 may include any of RBs 2102-2105. According to embodiments, a WTRU may (e.g., sequentially) map encoded CQI symbols to resource elements of OFDM symbols of a RBG. For example, a WTRU may map the encoded CQI symbols sequentially to a first resource element of a first OFDM symbol of a first RBG, then to a first resource element of a first OFDM symbol of a second RBG, and so on. In a case of sequentially mapping encoded CQI symbols, a WTRU may maximize frequency diversity gain according to frequency interleaving associated with (e.g., for) CQI on a PUSCH.

Figure 22:
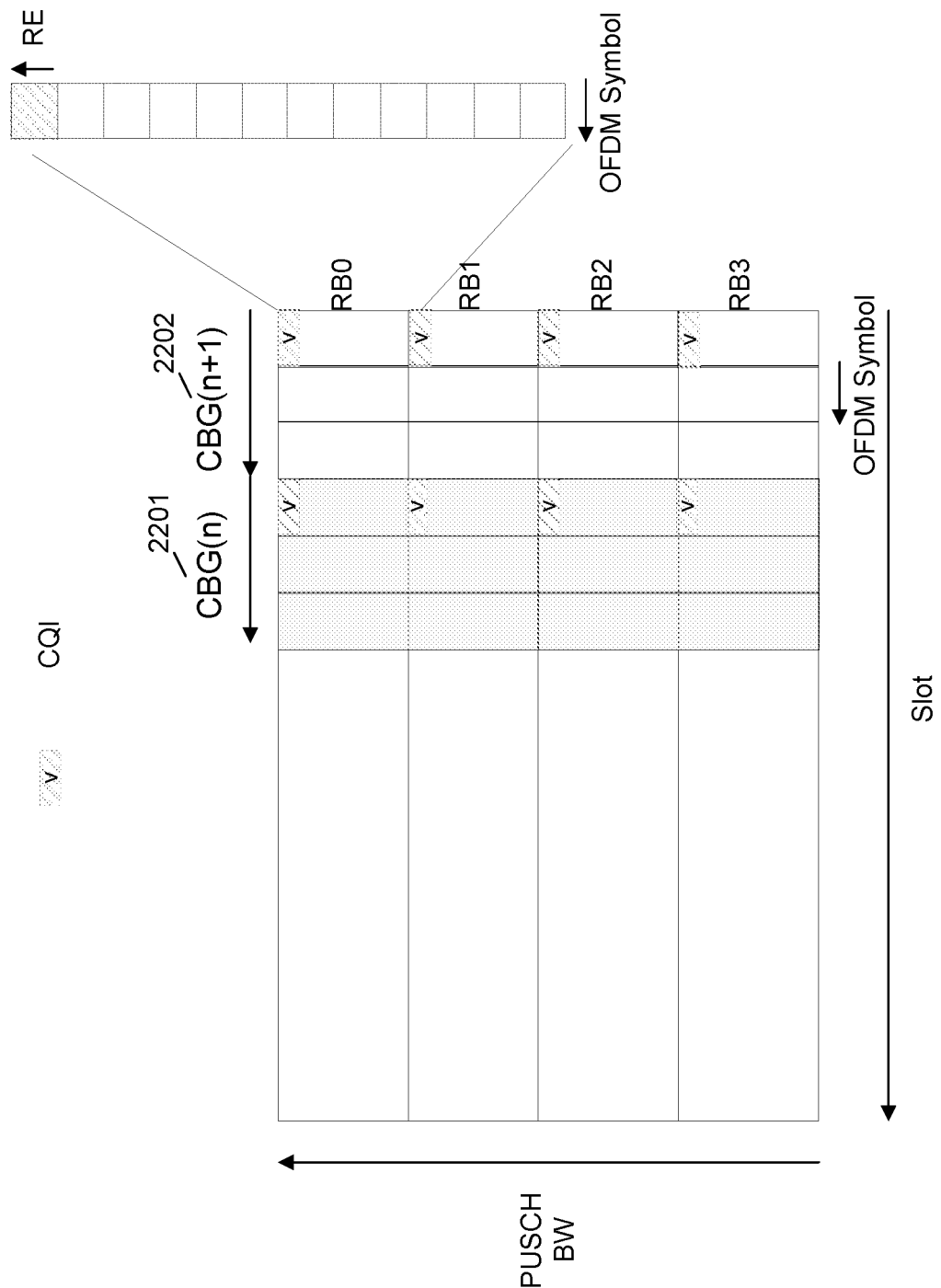
FIG. 22 is a diagram illustrating time-frequency interleaved resource mapping of CQI on a PUSCH according to embodiments.

FIG. 22 is a diagram illustrating time-frequency interleaved resource mapping of CQI on a PUSCH according to embodiments.

According to embodiments, a time duration for a PUSCH transmission may be partitioned into any number of OFDM symbols and/or CBGs. For example, referring to FIG. 22, a WTRU may partition an allocated time duration for a PUSCH transmission to one or multiple OFDM Symbols and/or CBGs, such as CBGs 2201, 2202. According to embodiments, each CBG may be associated with any number of OFDM symbols. According to embodiments, a WTRU may map encoded CQI symbols sequentially to a first resource element of a first OFDM symbol of a first CBG, then to a first resource element of a first OFDM symbol of a second CBG, and so on. In a case of sequentially mapping encoded CQI symbols, a WTRU may maximize time diversity gain according to time interleaving associated with (e.g., for) CQI on a PUSCH and may avoid excessive resource use of a single CBG.

According to embodiments, a time duration and a bandwidth duration may be set forth for (e.g., partitioned into) any of OFDM symbols, CBGs, or RBGs. According to embodiments, a WTRU may sequentially map encoded CQI symbols to respective resource elements of OFDM symbols according to CBGs and/or RBGs, for example, to achieve both time and frequency diversity gain. Referring to FIG. 22, a scheme (e.g., a pattern, a mapping) having partitioning of a time duration and a bandwidth duration, consisting of a RBG including one RB, is illustrated.

Figure 23:
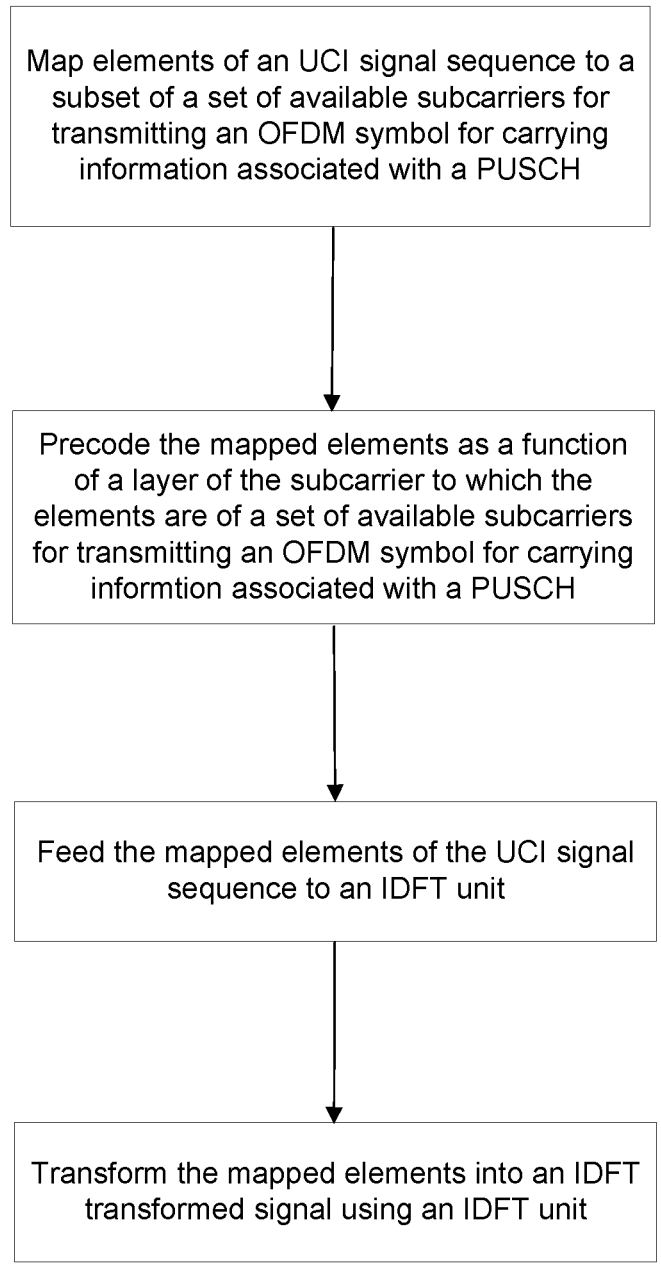
FIG. 23 is a diagram illustrating a method of generating an OFDM symbol performed by a WTRU according to embodiments.

FIG. 23 is a diagram illustrating a method of generating an OFDM symbol performed by a WTRU according to embodiments.

According to embodiments, a WTRU may include a transmitter, a receiver (and/or transceiver), and a processor performing the method illustrated in FIG. 23. Referring to FIG. 23, at operation 2301, a WTRU may map any number of elements (and/or information associated with any number of elements) of an UCI signal sequence to a subset of a set of available subcarriers for transmitting an OFDM symbol for carrying information associated with a PUSCH. At operation 2302, the WTRU may precode the mapped elements as a function of a layer of the subcarrier to which the elements are mapped. At operation 2303, the WTRU may feed the mapped elements of the UCI signal sequence to an IDFT unit, and at operation 2304, the WTRU may transform the mapped elements into an IDFT transformed signal using the IDFT unit. According to embodiments, the IDFT transformed signal may include the mapped elements of the UCI signal sequence carried by a plurality of resources for transmission.

According to embodiments, a first precoding applied to a mapped element of a first layer of a subcarrier may be different than a second precoding applied to a mapped element of a second layer of the same subcarrier. According to embodiments, the second precoding applied to the mapped element of the second layer may be determined according to any of: an indication from the associated DCI, a function of the first precoding matrix, and the UCI's associated resource index. According to embodiments, the mapped element of the second layer may include the same UCI as the mapped element of the first layer. According to embodiments, the precoding applied to a mapped element of a layer of a first subcarrier may be different than a precoding applied to a mapped element of the same layer of a second subcarrier. According to embodiments, a number of codewords used for transmitting a UCI signal sequence may be determined according to the number of layers of each subcarrier. According to embodiments, the codewords may be mapped to the layers of each subcarrier according to any of a rule, configuration information, or downlink control information (DCI).

According to embodiments, the mapping of the information associated with the elements of the UCI signal sequence may include any of: (1) puncturing the PUSCH or (2) rate matching the PUSCH. According to embodiments, the puncturing of the PUSCH may include replacing elements associated with data modulation symbols that are to be transmitted in the PUSCH with the elements of the UCI signal sequence. According to embodiments, rate matching of the PUSCH may include rate matching elements of a data modulation symbol of the PUSCH according to available resources. According to embodiments, the elements of the UCI signal sequence may be transmitted during a single subframe (or like-type partition of a radio frame).

According to embodiments, the UCI signal sequence may include control information associated with or for controlling uplink transmission. According to embodiments, the UCI may include information associated with any of an ACK/NACK, a RI, or CQI. According to embodiments, the OFDM symbol may be a Discrete Fourier Transform-spread OFDM (DFT-s-OFDM) symbol. According to embodiments, a WTRU may receive information associated with any number of elements of the UCI signal sequence at a DFT unit, and may precode the information using a DFT operation at the DFT unit so as to form frequency domain samples/signal of the UCI signal sequence for the DFT-s-OFDM symbol. According to embodiments, a WTRU may selectively: (1) puncture the PUSCH by replacing the elements associated with data modulation symbols that are to be transmitted in the PUSCH with the elements of the UCI signal sequence or (2) rate match the elements of a data signal sequence associated with data modulation symbols of the PUSCH, such that the rate matched elements of the data signal are disposed proximate to elements of the UCI signal sequence. According to embodiments, the WTRU may receive a transmission of the IDTF transformed signal as at least one OFDM symbol transmitted by the transmitter/receiver.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a UE, WTRU, terminal, base station, RNC, or any host computer.

Moreover, in the embodiments described above, processing platforms, computing systems, controllers, and other devices including the constraint server and the rendezvous point/server containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed".

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs), Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; and/or (iv) the like. Details of an example WTRU, which may be representative of any WTRU recited herein.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality.

Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶ 6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

The invention claimed is:

1. A Wireless Transmit/Receive Unit (WTRU), comprising:
   a processor and a transceiver which are configured to:
   receive scheduling information indicating a plurality of resource elements, comprising a plurality of subcarriers and a plurality of Orthogonal Frequency Division Multiplexing (OFDM) symbols, allocated for physical uplink shared channel (PUSCH) data,
   multiplex, in the plurality of resource elements, acknowledgment/negative acknowledgment (ACK/NACK) information together with the PUSCH data using, based on an amount of the ACK/NACK information, rate matching or puncturing,
   generate an output signal for transmission of the multiplexed ACK/NACK information and PUSCH data, and
   transmit the output signal as an OFDM signal,
   wherein the processor and the transceiver are further configured to,
   on condition that the amount of the ACK/NACK information is greater than or equal to a threshold amount, multiplex the ACK/NACK information together with the PUSCH data using rate-matching such that the PUSCH data is placed around the ACK/NACK information among the plurality of resource elements.

2. The WTRU of claim 1, wherein the processor and the transceiver are further configured to:
   on condition that the amount of the ACK/NACK information is less than the threshold amount, multiplex the ACK/NACK information together with the PUSCH data using puncturing such that the ACK/NACK information replaces the PUSCH data among the plurality of resource elements.

3. The WTRU of claim 2, wherein the amount of the ACK/NACK information is a number of ACK/NACK symbols.

4. The WTRU of claim 2, wherein the amount of the ACK/NACK information is a number of ACK/NACK bits.

5. The WTRU of claim 2, wherein the ACK/NACK information is placed in one OFDM symbol adjacent to an OFDM symbol associated with a demodulation reference signal (DM-RS) among the plurality of OFDM symbols of the plurality of resource elements.

6. The WTRU of claim 1, wherein the processor and the transceiver are further configured to:
   on condition that the amount of the ACK/NACK information is greater than or equal to the threshold amount, multiplex the ACK/NACK information together with the PUSCH data using rate-matching such that the ACK/NACK information is placed in a first OFDM symbol, of the plurality of OFDM symbols, adjacent to a second OFDM symbol, of the plurality of OFDM symbols, having a demodulation reference signal (DM-RS).

7. The WTRU of claim 1, wherein the amount of the ACK/NACK information is a number of ACK/NACK symbols.

8. The WTRU of claim 1, wherein the amount of the ACK/NACK information is a number of ACK/NACK bits.

9. The WTRU of claim 1, wherein the ACK/NACK information is placed in one OFDM symbol adjacent to an OFDM symbol associated with a demodulation reference signal (DM-RS) among the plurality of OFDM symbols of the plurality of resource elements.

10. A method, implemented by a Wireless Transmit/Receive Unit (WTRU), the method comprising:
- receiving scheduling information indicating a plurality of resource elements, comprising a plurality of subcarriers and a plurality of Orthogonal Frequency Division Multiplexing (OFDM) symbols, allocated for physical uplink shared channel (PUSCH) data;
- multiplexing, in the plurality of resource elements, acknowledgment/negative acknowledgment (ACK/NACK) information together with the PUSCH data using, based on an amount of the ACK/NACK information, rate matching or puncturing;
- generating an output signal for transmission of the multiplexed ACK/NACK information and PUSCH data; and
- transmitting the output signal as an OFDM signal,
- wherein, on condition that the amount of the ACK/NACK information is greater than or equal to a threshold amount, the multiplexing of the ACK/NACK information together with the PUSCH data uses rate-matching such that the PUSCH data is placed around the ACK/NACK information among the plurality of resource elements.

11. The method of claim 10, wherein,
- on condition that the amount of the ACK/NACK information is less than the threshold amount, the multiplexing of the ACK/NACK information together with the PUSCH data uses puncturing such that the ACK/NACK information replaces the PUSCH data among the plurality of resource elements.

12. The method of claim 10, wherein
- the multiplexing of the ACK/NACK information together with the PUSCH data using rate-matching includes placing the PUSCH data around the ACK/NACK information in a first OFDM symbol, of the plurality of OFDM symbols, adjacent to a second OFDM symbol, of the plurality of OFDM symbols, having a demodulation reference signal (DM-RS).

13. The method of claim 10, wherein the amount of the ACK/NACK information is a number of ACK/NACK symbols.

14. The method of claim 10, wherein the amount of the ACK/NACK information is a number of ACK/NACK bits.

15. The method of claim 10, wherein the ACK/NACK information is placed in one OFDM symbol adjacent to an OFDM symbol associated with a demodulation reference signal (DM-RS) among the plurality of OFDM symbols of the plurality of resource elements.

16. The method of claim 11, wherein the amount of the ACK/NACK information is a number of ACK/NACK symbols.

17. The method of claim 11, wherein the amount of the ACK/NACK information is a number of ACK/NACK bits.

18. The method of claim 11, wherein the ACK/NACK information is placed in one OFDM symbol adjacent to an OFDM symbol associated with a demodulation reference signal (DM-RS) among the plurality of OFDM symbols of the plurality of resource elements.

* * * * *